(12) United States Patent
Doskow et al.

(10) Patent No.: US 7,360,090 B1
(45) Date of Patent: Apr. 15, 2008

(54) METHOD OF AND APPARATUS FOR AUTHENTICATING CONTROL MESSAGES IN A SIGNALING NETWORK

(75) Inventors: Arthur Doskow, New York, NY (US); Harry A. Hetz, Silver Spring, MD (US); Kathleen F. Jarosinski, Baltimore, MD (US)

(73) Assignee: Verizon Services Corp., New York, NY (US)

( * ) Notice: Subject to any disclaimer, the term of this patent is extended or adjusted under 35 U.S.C. 154(b) by 674 days.

(21) Appl. No.: 09/767,292

(22) Filed: Jan. 18, 2001

Related U.S. Application Data

(63) Continuation-in-part of application No. 09/607,930, filed on Jun. 30, 2000.

(51) Int. Cl.
*H04L 9/00* (2006.01)

(52) U.S. Cl. ...................... 713/170; 713/178

(58) Field of Classification Search ............. 713/170, 713/168, 375, 178, 161, 181, 155; 709/223; 380/257, 225; 370/218, 230, 369, 375
See application file for complete search history.

(56) References Cited

U.S. PATENT DOCUMENTS

| | | | |
|---|---|---|---|
| 4,562,539 A * | 12/1985 | Vince | 709/214 |
| 5,430,719 A | 7/1995 | Weisser, Jr. | |
| 5,572,583 A | 11/1996 | Wheeler, Jr. et al. | |
| 5,835,583 A | 11/1998 | Hetz et al. | |
| 5,862,334 A | 1/1999 | Schwartz et al. | |
| 5,881,132 A | 3/1999 | O'Brien et al. | |
| 5,953,404 A | 9/1999 | Fikis et al. | |
| 5,987,035 A | 11/1999 | Silva | |
| 6,014,427 A * | 1/2000 | Hanson et al. | 379/67.1 |

(Continued)

OTHER PUBLICATIONS

Schneier, Applied Cryptography, 1996, John Wiley, 2nd Edition, p. 38 and 576-577 & 38.*

*Primary Examiner*—Thanhnga Truong
*Assistant Examiner*—Paula W Klimach

(57) ABSTRACT

A communication network includes an SS7 Security Gatekeeper that authenticates and validates network control messages within, transiting, entering and leaving an overlying control fabric such as an SS7 network. The SS7 Security Gatekeeper incorporates several levels of checks to ensure that messages are properly authenticated, valid, and consistent with call progress and system status. In addition to message format, message content is checked to ensure that the originating node has the proper authority to send the message and to invoke the related functions. Predefined sets of templates may be used to check the messages, each set of templates being associated with respective originating point codes and/or calling party addresses. The templates may also be associated with various system states such that messages corresponding to a particular template cause a state transition along a particular edge to a next state node at which another set of templates are defined. Thus, system and call state is maintained. The monitor also includes signaling point authentication using digital signatures and timestamps. Timestamps are also used to initiate appropriate timeouts and so that old or improperly sequenced message may be ignored, corrected or otherwise processed appropriately. The SS7 Security Gatekeeper may be located at the edge of a network to be protected so that all messaging to and from the protected network most egress by way of the Gatekeeper. Alternatively, the SS7 Security Gatekeeper may be internal to the protected network and configured as a "pseudo switch" so that ISUP messaging is routed through the Gatekeeper while actual traffic is trunked directly between the associated SSPs, bypassing the Gatekeeper.

40 Claims, 15 Drawing Sheets

U.S. PATENT DOCUMENTS

| | | |
|---|---|---|
| 6,081,591 A | 6/2000 | Skoog |
| 6,141,341 A | 10/2000 | Jones et al. |
| 6,226,289 B1 | 5/2001 | Williams et al. |
| 6,226,372 B1 | 5/2001 | Beebe et al. |
| 6,233,234 B1 * | 5/2001 | Curry et al. ............... 370/356 |
| 6,249,575 B1 | 6/2001 | Heilmann et al. |
| 6,282,267 B1 | 8/2001 | Nolting |
| 6,308,276 B1 | 10/2001 | Ashdown et al. |
| 6,324,271 B1 * | 11/2001 | Sawyer et al. ......... 379/142.05 |
| 6,560,327 B1 | 5/2003 | McConnell |
| 6,574,730 B1 * | 6/2003 | Bissell et al. ............... 713/168 |
| 6,614,781 B1 | 9/2003 | Elliott et al. |
| 6,647,113 B2 | 11/2003 | McCann et al. |
| 6,687,353 B1 | 2/2004 | Brysch et al. |
| 6,690,787 B1 | 2/2004 | Gradischnig |
| 6,718,024 B1 | 4/2004 | Heilmann et al. |
| 6,775,273 B1 | 8/2004 | Kung et al. |
| 6,826,173 B1 | 11/2004 | Kung et al. |
| 2002/0051526 A1 | 5/2002 | Yi |
| 2002/0052200 A1 * | 5/2002 | Arkko et al. ............... 455/432 |
| 2002/0071543 A1 | 6/2002 | Williams |
| 2002/0129241 A1 | 9/2002 | Doyle et al. |
| 2003/0108176 A1 | 6/2003 | Kung et al. |
| 2004/0042609 A1 | 3/2004 | Delaney et al. |

\* cited by examiner

ISDN User Part Message Format Coding
(LSSGR GR-606, Iss. 3 11/99)

| | | 8 | 7 | 6 | 5 | 4 | 3 | 2 | 1 |
|---|---|---|---|---|---|---|---|---|---|
| Flag | A | 0 | 1 | 1 | 1 | 1 | 1 | 1 | 0 |
| Forward sequence Information | B | BSN/BIB | Backward Sequence Number | | | | | | |
| Backward Sequence Information | C | FSN/FIB | Forward Sequence Number | | | | | | |
| Message length Indicator | D | Spare | | Length Indicator | | | | | |
| Service Information | E | National Network Opt. | | Mess Priority | | MTP User Part (ISUP) | | | |
| Routing Label | F | Destination Point Code | | | | | | | |
| | | Origination Point Code | | | | | | | |
| | | Signaling Link Selection | | | | | | | |
| CIC | G | Circuit Identification Code | | | | | | | |
| Message Type | H | Message Type | | | | | | | |
| ISUP Information Element | I | ISUP Parameters | | | | | | | |
| Check Bits | J | | | Check Bits | | | | | |

Figure 9

| Security Context |
|---|
| Security Context Length Indicator Parameter |
| Security Context Parameter Value |

Figure 11

| Security Context Values | |
|---|---|
| Value | Meaning |
| 0 | Not used. |
| 1 | Data Encryption Algorithm |
| 2 | Integrity Check |
| 3 | Message Code Authentication |
| 4 | Sequence, Timestamp and Identification |

Figure 12

| Name of ISUP Parameter | Length Indicator Parameter | Parameter Content | ... | Name of ISUP Parameter | Length Indicator Parameter | Parameter Content |
|---|---|---|---|---|---|---|

Figure 10

Address Complete Message

| SIO and Routing Label |
|---|
| CIC Low-Order Octet |
| 2-bits spare / CIC High-Order 6-bits |
| Message Type = 6 |
| Backward Call Indicator Bits H..A |
| Backward Call Indicator Bits P..I |
| Offset to Start of Optional Part |
| Optional Parameter Code |
| Optional Parameter Length Indicator |
| Optional Parameter No. of Octets = Length Indicator Value |
| End of Optional Parameters Indicator |

Fig. 16

Initial Address Message

| SIO and Routing Label |
|---|
| CIC Low-Order Octet |
| 2-bits spare / CIC High-Order 6-bits |
| Message Type = 1 |
| Nature of Connection Indicators |
| Forward Call Indicator Bits H..A |
| Forward Call Indicator Bits P..I |
| Calling Party Category |
| Offset of 1st Mandatory Var. Parameter |
| Offset of 2nd Mandatory Var. Parameter |
| Offset of Start of Operational Part |
| Length Indicator of User Service Info |
| User Service Information No. of Octets = Length Indicator Value |
| Length Indicator of Called Party No. |
| Called Party Number No. of Octets = Length Indicator Value |
| Optional Parameter Code |
| Optional Parameter Length Indicator |
| Optional Parameter No. of Octets = Length Indicator Value |
| End of Optional Parameters Indicator |

Fig. 15

Release Message

| SIO and Routing Label |
|---|
| CIC Low-Order Octet |
| 2-bits spare / CIC High-Order 6-bits |
| Message Type = 12 |
| Offset of 1st Mandatory Var. Parameter |
| Offset of Start of Operational Part |
| Length Indicator of Cause Indicators |
| Release Cause Indicator Parameter No. of Octets = Length Indicator Value |
| Optional Parameter Code |
| Optional Parameter Length Indicator |
| Optional Parameter No. of Octets = Length Indicator Value |
| End of Optional Parameters Indicator |

Fig 18

Answer Message

| SIO and Routing Label |
|---|
| CIC Low-Order Octet |
| 2-bits spare / CIC High-Order 6-bits |
| Message Type = 9 |
| Offset to Start of Optional Part |
| Optional Parameter Code |
| Optional Parameter Length Indicator |
| Optional Parameter No. of Octets = Length Indicator Value |
| End of Optional Parameters Indicator |

Fig. 17

Release Complete Message

| SIO and Routing Label |
|---|
| CIC Low-Order Octet |
| 2-bits spare / CIC High-Order 6-bits |
| Message Type = 16 |

Fig. 19

METHOD OF AND APPARATUS FOR AUTHENTICATING CONTROL MESSAGES IN A SIGNALING NETWORK

CROSS-REFERENCE TO RELATED APPLICATIONS

This application is a continuation-in-part application of Ser. No. 09/607,930, filed Jun. 30, 2000 and entitled METHOD OF AND APPARATUS FOR AUTHENTICATING CONTROL MESSAGES IN A SIGNALING NETWORK and is related to application Ser. No. 09/609,033, filed Jun. 30, 2000 and entitled METHOD OF AND APPARATUS FOR IN CONTEXT MEDIATING COMMON CHANNEL SIGNALING MESSAGES BETWEEN NETWORKS; to application Ser. No. 09/606,684, filed Jun. 30, 2000 and entitled METHOD OF AND APPARATUS FOR MEDIATING COMMON CHANNEL SIGNALING MESSAGE BETWEEN NETWORKS USING CONTROL MESSAGE TEMPLATES; and to application Ser. No. 09/607,931, filed Jun. 30, 2000 and entitled METHOD OF AND APPARATUS FOR MEDIATING COMMON CHANNEL SIGNALING MESSAGES BETWEEN NETWORKS USING A PSEUDO-SWITCH. The specifications of those applications are incorporated herein by reference in their entirety.

TECHNICAL FIELD

The present invention relates to switched telephone networks and, more particularly, to authenticating control message origination.

ACRONYMS

The written description uses a large number of acronyms to refer to various services and system components. Although generally known, use of several of these acronyms is not strictly standardized in the art. For purposes of this discussion, acronyms therefore will be defined as follows:

Automatic Code Gapping (ACG)

Address Complete Message (ACM)

Advanced Intelligent Network (AIN)

ANswer Message (ANM)

Called Party Address (CdPA)

Calling Party Address (CgPA)

Certification Authority (CA)

Common Channel Inter-office Signaling (CCIS)

Common Channel Signaling (CCS)

Competitive Local Exchange Carrier (CLEC)

Connect Acknowledge (ACK)

Destination Point Code (DPC)

End of Packet (EOP)

Initial Address Message (IAM—an SS7 ISUP message)

Integrated Service Control Point (ISCP)

Integrated Services [Digital Network] User Part (ISUP)

International Telecommunication Union (ITU)

Internet Protocol (IP)

Internet Service Provider (ISP)

IP Security Protocol (IPSec)

Length Indicator (LI)

Local Area Network (LAN)

Local Exchange Carrier (LEC)

Message Signal Unit (MSU)

Message Transfer Part (MTP)

Multi-Services Application Platform (MSAP)

Originating Point Code (OPC)

Plain Old Telephone Service (POTS)

Point Code (PC)

Point In Call (PIC)

Point of Presence (POP)

Public Switched Telephone Network (PSTN)

Release Complete Message (RLC)

Release Message (REL)

Service Activation Request Message (SARM)

Service Control Point (SCP)

Service Information Octet (SIO)

Service Switching Point (SSP)

Signal Gateway (SG)

Signaling Connection Control Port (SCCP)

Signaling Information Field (SIF)

Signaling Mediation Point (SMP)

Signaling Point (SP)

Signaling System 7 (SS7)

Signaling Transfer Point (STP)

Transaction Capabilities Applications Port (TCAP)

BACKGROUND ART

The network of switching nodes and transmission facilities forming the backbone of the traditional telecommunications industry has undergone extraordinary changes to adapt to the communications requirements arising from the telecommunications revolution. Not only has the need for more and faster communications grown at breakneck speed, but multiple entrants into the field of telecommunications service providers and the explosive demand for data communications (e.g., connectivity with and through the Internet) has prompted significant changes to provide commercially and governmentally mandated access to network facilities and capabilities.

Prior to enactment of recent regulatory changes affecting the telecommunications industry, the incumbent local exchange carrier (LEC) had virtually exclusive access to the elements and facilities comprising its network. In most cases, neighboring LECs and inter-exchange carriers interfaced with the incumbent LEC's network pursuant to Standards promulgated by organizations such as the American National Standards Institute (ANSI) and Requirements developed and set by organizations such as Bellcore, (now Telcordia Technologies.) Independent carriers were also subject to such Standards, but were not subject to the Requirements. Because of the clout of ILECs however, their vendors' equipment confirmed to requirements, as well. However, with recent regulatory reform and technological advancements "opening up" the network and resulting in the creation of competitive local exchange carriers (CLECs) and other types of carriers, the incumbent LEC requires ways and means to interface with and among these new and varied networks. Often, these new networks are structured differently from and/or use different messaging, signaling standards, protocols and procedures than the public switched telephone network (PSTN) deployed by the incumbent LEC, thus creating additional interface problems. Even when they attempt to use the same messaging, standards and protocols, they often do so using equipment with differing capabilities and requirements.

The need to interface with and accommodate varied network architectures and protocols has been further heightened by the rapid expansion of data communications requirements to accommodate users of the Internet. Typically, the LEC provides end terminus connectivity between the user's computer or local area network (LAN) and a central facility operated by an Internet Service Provider (ISP), termed a Point of Presence (POP). It is often desirable or necessary to provide the ISP with, not only communications access with the end user (i.e., payload data traditionally carried by a switched voice network), but also some limited form of access to signaling and control messaging transported by, for example, the LEC's common channel signaling (CCS) network, typically implemented as Signaling System 7 (SS7.)

SS7 is a standard established and maintained by the American National Standards Institute (ANSI) defining procedures and protocols used by network elements of PSTNs to exchange data for call setup, routing and control (e.g., ISUP messages) and for the exchange of non-circuit related information between signaling points (e.g., transactional TCAP messages). SS7 messages are transmitted between network elements, known as signaling points (SP) using 56 or 64 kbps bidirectional channels called signaling links. SPs include Service Switching Points (SSPs), Signal Transfer Points (STPs), and Service Control Points (SCPs). SSPs are the switches that originate, terminate, or route (i.e., "tandem") calls. SCPs provide centralized databases and support other centralized call processing functions required by special services (e.g., 800 numbers, enhanced call forwarding services, etc.) SCPs may be queried by an SSP using TCAP to obtain call routing and call handling information. The STPs route these network control messages over the SS7 network between and among the SSPs and SCPs as necessary. A complete description of such an SS7 system and supported Advanced Intelligent Network (AIN) supported by the system can be found, for example, in U.S. Pat. No. 5,572,583, incorporated herein in its entirety by reference.

Prior to the advent of competing carriers and network facilities, the connection between SS7 systems of incumbent LECs and IXCs relied on well defined and consistent interfaces. Typically, each carrier isolated its switched network from its SS7 network so that the latter was not accessible except at defined points of interconnection. Simple mechanisms were implemented which allowed restrictions to be placed on the types of signaling traffic that would be accepted from other networks.

With the advent of a liberalized interconnection environment, necessitated by an open network architecture, the interfaces between networks have been identified as points of vulnerability through which network impairing problems can be introduced. Such problems may be caused by unintentionally misdirected or erroneous messaging being introduced into a LEC's SS7 network at a point of interconnection or nefariously introduced messaging used to obtain unauthorized access to network facilities or to undermine network operations. To prevent improper and unauthorized access to the SS7 system, LECs have instituted specialized interfaces with other networks. These interfaces are commonly known as signaling mediation points, gateway screening systems or signaling system gatekeepers.

Telcordia Technologies (previously Bellcore) Generic Requirements document number GR-82-CORE provides requirements for STPs, used within signaling networks to connect network SPs to each other and to SPs in other networks. Traditional Gateway screening, defined in GR-82-CORE, facilitates the specification of specific messages that will be permitted into the network, based on message structure and the linkset on which the messages arrive. This screening is typically implemented using custom static tables created by the network operator. For example, traditional Gateway screening can be used to allow the transmission of all Transfer Prohibit (TFP) messages from a given Originating Point Code (OPC), addressed to a given Destination Point Code (DPC), and concerning a predesignated third Point Code (PC) into the network. These requirements were used by STP vendors to implement Gateway Screening between interconnected SS7 networks. Subsequently, various manufacturers have produced interface products known as SS7/IP Signaling Gateways (SGs) to interconnect SS7 signaling protocol with Internet Protocol (IP) based networks, such as the Internet. Commercially available equipment includes the MicroLegend SS7/IP Signaling Gateway, Ascend Signaling Gateway (ASG), Nuvo AIN platform SS7 Signaling Gateway by Mockingbird Networks, SGX2000 SS7 Signaling Gateway by Sonus Technologies, and others. In addition to performing protocol conversion between SS7 (and other CCS variants) and IP signaling, these Gateways may include a gateway screening function. Gateway screening, sometimes referred to as mediation, includes the selective control of signaling messages passed between networks based on parameters such as message origination and destination point codes, called and calling party addresses, etc. Thus, message header information may be examined to check whether a message is appropriate prior to routing.

Mediation is further described, for example, in Fikis et al., U.S. Pat. No. 5,953,404, incorporated herein by reference in its entirety. Fikis et al. describe a method and system for mediating signaling protocol dialogue between an internal signaling network operational domain operated by one network operator and an external signaling network operational domain operated by another network operator. SS7 traffic Message Signal Units (MSUs) arriving for mediation is divided into classes; some message classes are subject only to normal SS7 processing while others are further analyzed. MSUs requiring detailed analysis are routed to a mediation application process appropriate to that class. Alternatively, Signaling Connection Control Part (SCCP) address parameters are processed at a Signaling Mediation Point (SMP) so as to maintain normal SS7 message processing and routing functions while mediating individual messages. The disclosure further describes enabling the SMP to route a received MSU on toward its intended final destination based on information encoded in the Message Transfer Part (MTP) addresses contained in the MSU.

Fikis et al. further describe a Virtual Signaling Point (VSP) used to provide the SMP with information required to route a received MSU on toward its intended final destination using information contained in the MSU (OPC and DPC fields) together with a table maintained in the SMP. As described, an internal (external) SP perceives the VSP as its destination SP for the message rather than the intended external (internal) SP. Although the VSP does not exist as a separate Network Element, the internal and external SPs perceive it as an NE due to alterations made in MSUs by the SMP. Like an actual SP, a VSP is identified by its signaling point code. However, unlike an actual NE, the VSP signaling point code provides a unique mapping between the originating internal (external) SP and the true terminating external (internal) SP in addition to enabling routing of messages to the SMP.

Hetz et al., U.S. Pat. No. 5,835,583, assigned in common with the subject matter of the present invention, describe a central SMP in an AIN that stores call processing records for controlling call routing and other call processing functions. To provide short code access to information service providers, each information service provider operates an independent database storing additional call processing records. When an established subscriber dials the short code, e.g. an N11 code, the SMP identifies the information provider that the subscriber has previously selected from the subscriber's call processing record stored in the mediation point. The SMP communicates with that service provider's database to obtain call processing information. The SMP then validates the call processing information for compatibility with network operations and forwards validated call processing information to a node of the network to process the call in accord with the information from the provider's database.

Schwartz et al., U.S. Pat. No. 5,862,334, describe a network service access system and method for intelligent networks including an SMP between network SSPs and third party service provider SCP. The SMP is a gateway to the AIN network for the service provider SCPs. Each message from the SCP (Query, Conversation, Response, Unidirectional) is screened. For example, the global title address in the SCCP called party address field is screened against a list authorized SS7 nodes. The SMP may also perform other screening, for example, TCAP (Transaction Capabilities Application Part) and AIN message screening. After normal TCAP and AIN Message screening (both response and unsolicited messages), if an error is found the screening failure is pegged and the message is logged. The erroneous message is then discarded.

Weisser, Jr. et al., U.S. Pat. No. 5,430,719, describe a method of mediating traffic across an interface between an AIN operated by a LEC and an outside service provider. The interface is defined between an application by a non-local exchange carrier service provider for some form of enhanced telephone service requiring use of the AIN and a shared execution environment interpreter on the other side of the interface. Mediation is conducted by the shared execution interpreter that is run on a LEC operated SCP. The shared execution interpreter enforces sufficient rules so that the LEC does not require knowledge of the details of implementation of the service provider's application. Mediation includes testing of tables to determine whether a directory number referenced in a message request from a service provider application is a customer of the service provider, whether trunk group routing requests are valid for the service providers and whether any or particular levels of access to certain network elements are authorized for the requesting service provider.

While these systems and methods mediate between diverse remote networks and a LEC's SS7 network by checking information related to routing, the systems fail to provide a level of security that would protect the LEC's SS7 and the PSTN (of which it is a part) from properly formatted and addressed but otherwise improper messages. This message validity checking, according to the prior art, is further deficient in its inability to readily accommodate messages received from sources wherein message origination information may be difficult to verify, e.g. messages received from distant, non-contiguous LEC's, non-LEC service providers, etc. Considering that these messages may originate on and/or be transported by relatively insecure networks including, for example, the public Internet, the problem of providing access while limiting any resultant threat to the PSTN caused by spurious, erroneous, or malicious messages is made more difficult. Finally, the prior art is deficient in that it fails to examine the context in which a message is received. Messages which are appropriate at one point in a call or transaction may be inappropriate under other conditions, depending either on the state of the call or transaction, or on the specific data elements passed in prior stages of the call or transaction.

DISCLOSURE OF THE INVENTION

The present invention overcomes the above noted problems by providing systems and call processing methodologies that analyze signaling traffic to identify, correct and/or reject inappropriate, invalid and/or harmful messages. The invention is particularly applicable to message traffic between networks wherein one of more of the networks has an open architecture. To provide network security, the present invention may analyze how a particular message will affect the network in consideration of the current state of the network and calls or transactions within it. The analysis is based in part on collecting and monitoring messages both to and from the network, correlating messages related to a particular service or event execution, and maintaining and updating current network status information (i.e., a "state" representation of the network, services, and other components and applications). Message checking may be implemented using predefined sets of message templates to filter corresponding message sequences and types based on the state of the related service and that of the network. It may also be enhanced by defining required relationships between successive messages associated with a call or transaction. Security may be further enhanced by including point code verification using digital signatures and time stamping to authenticate message origination and ensure message integrity. The invention further includes implementing a gatekeeper platform as a "pseudo-switch" that appears to the network as a tandem SSP. ISUP messages are routed to the "pseudo-switch" while specific use interoffice trunks bypass the platform, directly connecting traffic between the SSPs. These are some of several architectures in which the Gatekeeper function can be implemented.

A Security Gatekeeper (alternatively referred to as a Signaling System Security Monitor) according to the invention, screens down to the application layer and inspects for inappropriate application messages, parameters and/or parameter values as well as inappropriate relationships between messages. In the case of certain violations, the Gatekeeper modifies messages (e.g., removes a parameter, modifies a parameter value, etc.), rather than merely allowing the message to progress into and/or through the network or rejecting and discarding non-conforming messages. This is accomplished, in part, by screening in context, maintaining the state of ongoing signaling exchanges (e.g., call setup, application query/response) and rejecting or modifying messages that are inappropriate to the current state of the exchange and, as necessary, generating corrective messages. This context screening maintains network operations and avoids "hanging up" the network in an unstable state. In addition to network timers that may eventually release a call if no response is received, the Security Gatekeeper provides a more rapid and graceful exit by generating call treatment information and releasing the call, making network resources available more quickly. This type of capability is equally applicable for the termination of transactions.

The Security Gatekeeper further can correlate messages received at different locations. Because related signaling messages may enter and/or leave a network at or by way of different STPs, or even STP pairs, the Security Gatekeeper must be able to correlate messages received on different linksets in different locations. Correlation may be performed based on such parameters as the origination and destination point codes of messages, trunk circuit identification codes, correlation IDs, subsystem numbers, etc. The Security Gatekeeper further facilitates screening based on a protocol definition of an allowable exchange, i.e., using sets of templates. The Security Gatekeeper permits the network operator to provision the gateway to permit message exchanges that are consistent with a predetermined agreed-to service definition (while discarding or modifying messages inconsistent with that definition). These template definitions can include allowable messages, message sequences, message parameters, and parameter values and can also specify the relationship between parameters in successive messages (e.g., same phone number in query and response). For example, the Security Gatekeeper may use a template check to prohibit an AIN message from inappropriately modifying billing records, such as charging a call to someone else's account.

State-based screening examines messages based on the context in which the messages arrive. To implement state-based screening, the Security Gatekeeper maintains information on the states of calls and/or transactions for which the screening is performed. Examples include Call Setup and Transaction query/response. The Security Gatekeeper maintains the status of the underlying state machines, which define the possible call and/or transaction states and the legitimate transitions from one state to another as well as the relationships between parameters in successive messages. Such a state transition table or graph would be used, for example, to allow an ACM, ANM or REL message in response to an LAM, but would prohibit an RLC message.

The use of template based screening ensures that proprietary internetwork services continue to operate consistent with negotiated agreements with interfacing networks. Where such services are implemented via a query message, i.e., a query/response exchange with one or more databases or other nodes, the Security Gatekeeper includes protocol templates specifying the message exchange necessary to implement the service. This template identifies the formats of the invoking queries, including allowed message types, mandatory and optional parameters, and ranges of parameter values. The templates may also be specific to the destination point code. For example, templates may be SSP specific to account for differences between switches provided by different manufacturers or specific to a particular OPC to limit the type (and possibly number) of control messages received and/or processed from a particular system. Likewise, pairs of templates may be used to map between SP (e.g., SSP, STP and SCP) formats and protocol requirements.

For responses or other successive messages, the templates identify message types, mandatory and optional parameters and value ranges, and, in addition, the relationship between parameters and parameter values in the initial message and those in successive messages. For example, if a query identifies a specific telephone number, the response can likewise be required to pertain to that specified telephone number.

Template based screening implemented by the Security Gatekeeper provides for efficient message checking and verification in an environment wherein network elements are owned or controlled by the third party databases or applications. In such case, the applications are proprietary and under the control of an entity other than the network operator, i.e., the LEC operating the Security Gatekeeper. While the third party service may be certified prior to interconnection, the LEC network operator has no means of ensuring that the entire application has been tested under all conditions or that the service has not and will not be modified without notice, testing and recertification. This problem is further compounded by the reluctance of application developers and competing service providers to provide network operators with access to their intellectual property in the form of the underlying service logic or to the hardware platform running the application. Thus, the template methodology implemented by the Security Gatekeeper forms a common ground for agreement, defining the signaling that will be exchanged, without necessarily disclosing or defining the service that will be provided or the details of its implementation. The template definitions can also be used to help certify the proposed application. Once an application has been certified, the Security Gatekeeper monitors transactions on an ongoing basis to ensure that each conforms to the appropriate template. By enforcing the agreed to protocol definition of the application, the Security Gatekeeper insulates the network operator from concerns about the safety and stability of the application while providing the third party service provider the flexibility to make non-protocol affecting changes to the service and to protect its intellectual property.

Message authenticity is verified using digital signatures and time stamps. Thus, the Security Gatekeeper functions as a certification agent or authority (CA) for the LEC's SS7 network and interfaces with other and/or higher level CAs to obtain and maintain required digital certificates. Use of a digital time stamp both ensures non-reuse of signatures and provides for time-outs so that old or superceded messages are identified and processed appropriately.

According to one aspect of the invention, a communication network includes local communication links and multiple, separately located, central office (CO) switching systems. The CO switching systems are interconnected via trunk circuits so as to selectively provide switched call connections between two of the local communication links as commanded by appropriate control data messages. A signaling communication system interconnects and provides two-way communications of the control data messages between the CO switching systems. A signaling gateway, also separate from the CO switching systems, connects to the signaling communications system. The signaling gateway includes an interface connected to a remote communications network (e.g., a neighboring or competitive LEC, IP Telephony provider, Internet provider, etc.) and exchanges the control data messages between the remote communication network and the signaling communication system. A signaling system security monitor (i.e., the SS7 Security Gatekeeper), separate from the CO switching systems, evaluates an encrypted portion of the control data messages so as to authenticate corresponding ones of the control messages and, in response, determines if the control data messages are proper.

According to a feature of the invention, the signaling system security monitor functions as a certification agent to exchange and maintain encryption key certificates and may further be configured to issue and decrypt digital time stamps. The monitor may also function as digital certificate issuing authority (i.e., Certification Authority (CA)).

According to another feature of the invention, the signaling system security monitor is configured to selectively communicate the control data messages between the signaling gateway and the signaling communication system in response to the encrypted portions of the control data messages The monitor may further selectively enable and inhibit the signaling gateway from exchanging the control data messages between the remote communication network and the signaling communication system in response to authentication based on the encrypted portions of the control data messages.

According to another feature of the invention, the signaling system security monitor includes a memory storing states of respective ones of the CO switching systems. The processor is responsive to the states for determining if the control messages are proper.

According to another feature of the invention, the signaling system security monitor is configured to selectively modify (i.e., change rather than summarily reject) the control messages in response to a determination of a propriety of the control messages.

According to another feature of the invention, a signal protocol converter converts SS7 type messages to another packet data format such Internet Protocol (IP), Transmission Control Protocol (TCP), Voice over Internet protocol (VoIP) H.323 or MGCP, etc. Using SS7, the signaling system security monitor is configured to monitor information contained in an MTP Layer 3 portion of the control data messages. The information monitored may include (i) a destination point code, (ii) an originating point code, and/or (iii) a service indicator. The signaling system security monitor may monitor either MTP, SCCP, ISUP and TCAP (the latter including AIN) messages or combinations of these message types. The signaling system security monitor may also monitor calling and called party address parameters contained in SCCP message portions of the control data messages and determine if the monitored calling and called party address parameters are consistent with an authorized signaling relationship.

According to another feature of the invention, the signaling system security monitor is configured to monitor origination and designation point codes and calling and called party address parameters contained in a TCAP message portion of the control data messages and may determine if a particular destination point code is authorized to send a particular TCAP message to a particular destination point code.

According to another feature of the invention, the signaling system security monitor includes a memory storing a state of the communications network and/or permissible states of the communications network and rules for transitioning from each of the permissible states to others of the permissible states. The system may further store data relating call progress status with respective sets of control messages appropriate to initiate a next action consistent with a particular service.

According to another feature of the invention, the message templates are associated with respective service providers. The signaling system security monitor associates each of the control data messages with a corresponding one of the service providers and selects one of the message templates in response to the corresponding one of the service providers. The templates are grouped into sets, each of the sets corresponding to control messages appropriate to particular call progress flow. Each template within a set may define message formats, parameters and values associated with control message types selected from SCCP, ISUP, TCAP and AIN type messages. The signaling system security monitor is configured to select the sets of templates in response to service provider authorization data associated with respective ones of the control data messages.

According to another aspect of the invention, a method of securely interfacing control links of respective communication networks exchanges control data messages between a remote communication network and a local signaling communication system. A certificate portion of the control messages is decrypted or deciphered so as to authenticate origination point code information. In response to the resultant decrypted plaintext certificate or data, control data messages are selectively communicated between central office switching systems. These control messages initiate and support selective provisioning of switched call connections between at least two of the local communication links in response to predetermined control data messages.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 9 is a diagram of and ISUP message coding format including MTP header and trailer.

FIG. 10 is a diagram of the coding of parameters within an ISUP message.

FIG. 11 is a diagram of the ISUP security context parameter.

FIG. 12 is a diagram of security context parameter values for ISUP messages.

FIG. 15 is a diagram of an ANSI Initial Address Message (IAM) format template.

FIG. 16 is a diagram of an ANSI Address Complete Message (ACM) format template.

FIG. 17 is a diagram of an ANSI ANSWER Message (ANM) format template.

FIG. 18 is a diagram of an ANSI Release (REL) Message format template.

FIG. 19 is a diagram of an ANSI Release Complete (RLC) Message format template.

BEST MODE FOR CARRYING OUT THE INVENTION

Figure 1:
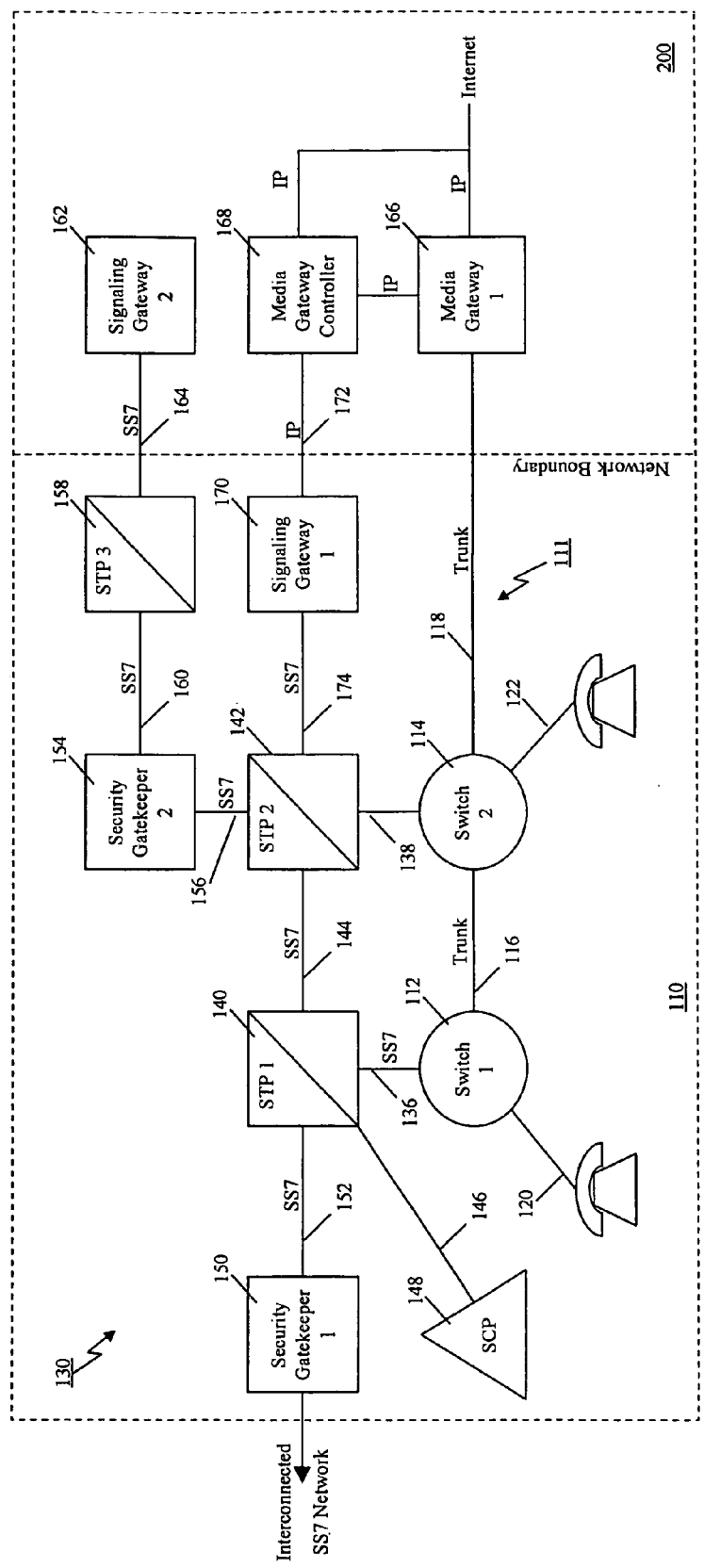
FIG. 1 is a simplified schematic block diagram of an Advanced Intelligent Network incorporating a Security Gatekeeper for mediating messages to and from the SS7 network.

Capabilities defined in AIN 0.1 and succeeding releases provide an SCP with a significant degree of control over switch processing. This control is exercised when the SCP returns an AIN response message to a switch from which it has received an AIN query. AIN capabilities enable a service provider to rapidly develop and deploy services that require control of the switch. As originally envisioned, it was assumed that a single service provider would own both the switch and SCP, and that the SCP would be used by the service provider to control their switch. Recent initiatives, however, have raised the possibility that the same switch capabilities that were designed to be controlled by the owning service provider, may now be made available to other service developers. This access may take the form of either (i) access to the original service provider's service creation capabilities in its SCPs, or (ii) interconnection with external SCPs (where the services are defined).

The capability of an external party's service application to return an AIN response to a switch leaves the switch vulnerable to messages that either unintentionally or malevolently cause or direct the switch to undertake inappropriate or damaging actions. Switch owners and operators therefore require some means of ensuring that, in allowing externally developed applications to interact with and exercise control over their switch, they are not exposing themselves and their customers to activities which have the potential to detract from network or customer reliability, integrity, and service.

Likewise, external service developers are not without their concerns. The service development world is expected to be highly competitive. Service definitions, specifications, and interfaces represent intellectual property that they would prefer not to share. So while the switch owner/operator wants to know as much as possible about the service that has the capability to control and affect the operation of its switch, the service developer wants to reveal as little as possible.

Screening performed according to the present invention extends the capabilities of conventional Gateway Screening. Thus, gateway screening according to the invention includes and improves upon conventional Gateway Screening as defined in Telcordia GR-82 and implemented in prior art systems and products. A Security Gatekeeper (alternatively referred to as a signaling system security monitor) according to the invention is applicable, for example, to an SS7 based switched telephone network and can be used to prevent inappropriate messages from entering a carrier's signaling network from an interconnected network. While Screening may not detect all incursions and harmful messages, its fundamental principle can be applied to address the issue of AIN interconnection. A fundamental feature of Gateway Screening is to identify, from a protocol standpoint, those messages which are expected to be exchanged with an interconnected network and selectively block those messages that do not meet this expectation. A protocol template identifies expected message types, message parameters, and possibly, a set of allowable values for those parameters, and may be used, according to this invention, to more thoroughly screen incoming signaling.

To use this approach, a service developer identifies the following:

1) A specification of the switch trigger(s) and the switch (es) at which they are to be implemented required to activate the service and their translation.

2) Specifications of the queries that the service developer expects to be generated by the switch when trigger conditions are met.

3) A specification of the response message(s) that the switch owner/operator can expect in response to each such query including the Point Code(s) and subsystem(s) from which they will be generated.

Item 2 should fully specify the message, (both SCCP and TCAP) indicating all parameters that should appear in the message and the range of allowable values for these parameters. Next, any allowable optional parameters should be specified along with possible values.

Item 3, should specify the returned message(s) on a parameter by parameter basis, indicating either the allowable values for the parameters, and/or their correlation to values found in the query (or elsewhere in the response). Again, allowable optional parameters should follow the parameters that will be included all responses.

Thus, item 3 could specify, for example, whether an Automatic Code Gapping (ACG—a method of shedding load in telecommunications systems) component may be returned and it could further specify that the Translation Type in the ACG will match the Translation Type in the Called Party Address of the query identified in item 2, and that the code to be gapped will be the first 3, 6, or 10 digits from the Global Title Address in the same parameter. If the parameters required to deactivate a trigger are included in 3, the specification should include a restriction that the trigger to be deactivated is associated with the line number to the triggering telephone number, found in the query.

This specification itself has multiple uses, as follows:

1) The specification forms a basis to conduct an analysis of the potential impacts of the service. Without knowing the exact nature of the service, service certification to identify possible incompatibilities and/or harmful impacts can be performed based the specified protocol exchange. No knowledge of proprietary service logic and implementation details is needed.

2) The specification can be used in the course of lab and field testing to verify that the messages exchanged are consistent with the specification.

3) The specification can form the basis of a contractual agreement between a Service Developer and the network operator that identifies recourse and damages should live protocol differ from the specification (to include disconnection of the service, financial penalties, etc. as appropriate).

4) The specification can form the basis of a passive evaluation template that correlates queries with their associated responses and identifies any exchanges that violate specifications, whether by omission of listed parameters, inclusion of unlisted parameters, or violations of parameter value or correlation rules.

5) The specification can form the basis for active security assessment that works as described above, but may prohibit unauthorized responses violating the specifications. Active security assessment can include guidelines specifying conditions under which responses and messages are discarded (e.g., the inclusion of an invalid parameter), and under which conditions alarms are triggered for subsequent investigation.

Thus, a signaling system security monitor or "Security Gatekeeper" according to the invention provides security functions for protecting a common channel signaling (CCS) network used to exchange information and instructions and control a separate, subordinate traffic bearing network. The traffic bearing network may be a switched telephone network operated by an incumbent, competitive or alternative local exchange carrier (LEC) or other carrier, while the CCS network may utilize Signaling System 7 (SS7). The Security Gatekeeper monitors all messaging between the local CCS network to one or more remote networks. Signaling messages both to the local CCS network from the remote network and messages from the local CCS network to remote networks are monitored and correlated to maintain an updated status of processing being implemented by particular sets of related bidirectional messages. The invention may also be used to monitor messages within a carrier's network, i.e., internal messaging. Message authentication is also implemented by the Security Gatekeeper using time stamped, digital signatures and/or digital certificates. In addition to message authentication, the Security Gatekeeper checks the content of each message to ensure that message type is consistent with the privileges and authority of the message originator and that message formatting and content is correct and consistent with the indicated message type and associated services. The Security Gatekeeper further checks message content in consideration of other messages and system status so as to identify, intercept, modify and/or reject improper or inappropriate messages. This check is preferably accomplished using rules and message templates selected in response to previous related messaging, current system status or state, and agreed upon sets of services to be provided to the interconnected party(ies).

In an "edge" configuration, the Security Gatekeeper serves as a point of signaling interconnection, providing an interface with the remote network so that all CCS messaging is routed through the Security Gatekeeper prior to introduction into the SS7 network. Alternatively, in an internal configuration or "centralized model", the gateway may alter the destination address of incoming and outgoing messages or, in other ways, divert such messages to a central Security Gatekeeper prior to permitting the messages to access Signaling Points inside or outside the network. (In yet another configuration, the Security Gatekeeper is associated with an STP that diverts incoming messages to the Security Gatekeeper for mediation processing). Routing of TCAP messages may be accomplished using a Global Title Translation such that all outgoing queries are Global Title Translated to a mediation point which reoriginates the TCAP queries using its own Point Code and Application Subsystem in the Originating Point Code and Calling Party Address. ISUP messages may be rerouted using a phantom SSP or "pseudo-switch" paradigm. One aspect of the invention includes establishment of a phantom or "pseudo-switch" in the network. The ISUP mediation function is placed in the "pseudo-switch", a network element that appears like a switch to the interconnecting network. In such a configuration, the voice trunks from the interconnected network are connected to a "true switch" in the network, but call setup messages are addressed to the "pseudo switch". The function performed by the "pseudo switch" is to receive an ISUP message from either the interconnected switch or the "true switch", validate it, update call state, and then forward it to the appropriate destination. ISUP messaging destined for more than one target switch is distinguished by using distinctive trunk numbering so that the pseudo-switch can distinguish between intended destinations without requiring multiple point codes to address the pseudo-switch.

The Security Gatekeeper further includes a mechanism for authenticating the source of signaling messages originating in, or transacting with the PSTN's SS7 Network, and supports the ability to timestamp an SS7 signaling message, check the message using, for example, predetermined templates, to identify inappropriate, unauthorized and/or network impairing messages.

The state monitoring and template provisioning aspects of the Security Gatekeeper are based on the normal, predetermined allowed system states encountered as a call progresses through the network. This progression is called a call model, defining sequences of events that are to occur at certain points in a connection relationship between two users at terminal nodes of the network or networks. These events include signaling messages being sent and received on a common channel signaling network and on the underlying switched telephone network on which payload traffic is carried. They are equally applicable to a transaction, an exchange of messages between two or more signaling nodes.

Message monitoring includes the following categories and types of checks:

| Category | Description |
| --- | --- |
| Routing Check | Discriminates among incoming traffic based on the originating address of the traffic (originating point code, OPC), the destination address of the traffic (destination point code, DPC), identification of link-set (e.g., gateway or STP) on which message is received by the network, and the message type. |
| Syntax Screening | Identifies and decodes individual messages and checks: information/parameters for compliance with protocol and format requirements; consistency of parameters with agreements; compatibility of system components with parameters and parameter values (vendor specific features and operability requirements included); and appropriateness of parameters. |
| Context-dependent Screening | Appropriateness of message in view of prior related messages and expected/allowed message sequencing, existing service agreements, state of the network, privilege levels associated with OPC, DPC, CdPA and CgPA, etc. |

Referring to FIG. 1, a Switched Telephone Network 111 includes a bearer type communications network 111 and signaling network 130, the latter including STP pairs 140, 142, and 158, linksets 136, 138, 144, 146, 152, 156, 160, and 174, Signaling Gateway 170, and Security Gatekeepers 150 and 154. Switched voice telephone network 110 comprises, for example, a matrix of terminating and tandem voice and data switches 112 and 114, interconnecting trunks 116, 118, and telephone lines 120, 122. A separate signaling network 130 transports messaging between switches (i.e., SSPs) 112 and 114. These messages include ISDN User Part (ISUP) and Transaction Capabilities Application Part (TCAP) messages. ISUP messages are used to set-up, manage and release circuits that carry voice and data calls over Switched Telephone Network 110 including to set up calls between Switched Telephone Network 110 and packet-based network 200, while TCAP messages are contained within the data parameter of the SCCP portion of an MSU and support non-circuit related information exchange between signaling points using the SCCP connectionless service. The SSPs interface with signaling switching facilities via SS7 "A" (access) linksets 136 and 138 connecting these signaling points to STP pairs 140 and 142. Although not shown, each STP, 140 and 142 consists of a mated pair of STPs interconnected by respective "C" (or cross) links. STP (pair) 140 is connected to STP (pair) 142 by "B" ("bridge") or "B/D" linkset 144.

STP (pair) 140 is further connected via "A" linkset 146 to SCP 148 to provide access to information stored in its centralized database and to functionalities supported by applications residing and running on the SCP. Note that although not shown here, SCPs are generally deployed in pairs as well. SCP 148 may be a Telcordia Technologies ISCP. Security Gatekeeper 150 connects to STP 140 on "B/D" link 152, while a second Security Gatekeeper 154 connects to STP 142 on "B/D" link 156 and to third STP 158 on "B/D" link 160. Security Gatekeeper 150 provides enhanced message screening functions and services to ensure that network affecting control messages received from a remote network are properly formatted, authorized, and appropriate to the functions authorized to the source and the current state of the network and related messages. (Although not explicitly shown, a preferred embodiment of the invention includes Security Gatekeepers deployed in mated pairs, connected by C links.) Security Gatekeeper 150 provides enhanced message screening with another interconnected SS7 network. Security Gatekeeper 150 shows the (preferred) "edge" implementation of the Security Gatekeeper, while Gatekeeper 154 shows the "centralized" implementation.

Messages to and from remote network 200 are received at Media Gateway 166 which may be in the form of or include a trunking gateway interfacing Telephone Network 100 and a Voice over IP (VOIP) network portion of remote network 200. Call control signaling is provided by Media Gateway Controller 168. Suitable Media Gateways include ECI Telecom's ATX 600, the Cisco TransPath system, APEX Media Gateway by Apex Voice Communications, and others. The Media Gateways separate and distribute various media types (e.g., voice, data, facsimile, etc.) and control signaling, reformatting and providing the payload data to the appropriate networks and transmission facilities as required. Control signaling is segregated and forwarded, in IP format, to Media Gateway Controller 168. Media Gateway Controller 168, in turn generates a signaling request of the interconnected network and forwards that request to Signaling Gateway 170 for conversion to SS7 and routing to its destination.

Signal Gateway 170 communicates using an IP data link 172 with Media Gateway Controller 168 and using an SS7 "A" linkset 174 with STP pair 142. Signal Gateway 170 may be a MicroLegend SS7/IP or Sonus SGX2000 SS7 Signaling Gateway. Signal Gateway 170 is a point of entrance to and exit from SS7 network 130 and performs code and protocol conversion to facilitate traffic between the SS7 and IP networks. In OSI terms, Signal Gateway 170 provides mapping at all seven layers of the OSI model. Similarly, Signal Gateway 162 provides access to remote networks (not shown) for STP 158 and, therethrough, to Security Gatekeeper 154.

Although Signaling Gateways 162 and 170 perform protocol conversion and may include some screening functions, Security Gatekeepers 150 and 154 provide robust security functions supporting these gateways, including maintaining user profiles and performing authentication and other functions. These additional functions include context based checks ensuring that message content and the network's reaction to the message are appropriate in view of the state of the network including previously generated messages. The Security Gatekeeper further enhances authentication and verification of message sequencing and timeliness by appending or encoding messages with digital signatures and timestamps. A Security Gatekeeper with an IP interface (not shown) can perform functions in accordance with the H.323, H.248 and other emerging IP protocol standards as appropriate.

Security Gatekeepers 150 and 154 differ in placement relative to interconnecting SS7 Networks of CLECs and remote LECs. In particular, Security Gatekeeper 150 is provided at the "edge" of the protected network to screen and, if necessary, inhibit or modify Network Management ISUP, TCAP, AIN and similar messages prior to allowing the messages into the protected network. Thus, Security Gatekeeper 150 monitors and selectively relays messages between the protected and external SS7 networks. This preferred implementation of the invention avoids the necessity of diverting signaling traffic from an STP to the Security Gatekeeper and then back. It also eliminates the need for the special "check" and "OK" messages. Alternatively, Signal Gateway 170 and STP pair 158 may interface external networks with the protected network by routing these messages to an internal Security Gatekeeper 154 prior to ultimate transmission to a destination or terminating STP. In this latter, centralized model, additional security check messages are required, as will be discussed in connection with FIG. 7 below.

Referring to FIG. 1, Security Gatekeeper 154 is internal to the network such that messaging to and from remote networks and the associated SS7 Signaling Gateway 170 and/or STP pair 158 is routed through a Security Gatekeeper 154 prior to reaching a destination or terminating STP 140 or 142.

Routing of TCAP queries and ISUP messages may be handled somewhat differently in this architecture. This is because TCAP message traffic may be easily rerouted so that it goes through a mediation point, i.e., Security Gatekeeper 154. The fact that TCAP queries are routed using Global Title Translation provides one simple method of routing queries and responses through a mediation point such as Security Gatekeeper 154. In essence, all outgoing queries are Global Title Translated to Security Gatekeeper 154 which reoriginates the TCAP queries using its own Originating Point Code and Subsystem. Responses to those queries are then automatically routed back to Security Gatekeeper 154, where they are validated. Similarly, incoming queries are either directly routed to Security Gatekeeper 154, or are directed to it by Global Title Translation of the incoming message. Security Gatekeeper 154 then reoriginates the query using its own originating point code and subsystem, validates the response, and forwards it back to the original, true query originator. Although this solution conceals the true originator from the ultimate destination, Security Gatekeeper 154 otherwise performs the appropriate checks including verifying the authority of the true originator to initiate the query.

The diversion of ISUP traffic to a mediation point is somewhat more difficult. This is because ISUP messaging is directly addressed from one switch to another, referencing a common resource (the interconnecting trunks) and uses MTP routing, rather than SCCP routing so that it is harder to devise methods by which ISUP messages can be easily diverted for mediation.

To overcome this difficulty, a phantom or "pseudo-switch" may be established in the network. The mediation function is then placed in the Security Gatekeeper "pseudo-switch", a network element that appears like a switch to both the interconnecting and the internal networks. In such a configuration, the voice trunks from the interconnected network are connected to the "true switch", but call setup messages are addressed to the Security Gatekeeper "pseudo switch". The function performed by the Security Gatekeeper "pseudo switch" is to receive an ISUP message from either the interconnected switch or the "true switch", validate it, update call state, and then forward it to the appropriate destination. Thus, physical routing of the "voice and data traffic" bypasses the "pseudo switch" by way of direct trunks, but the associated signaling traffic passes through the "pseudo switch", where it is verified before being passed on.

In such a Security Gatekeeper "pseudo-switch" architecture, an incoming call is processed as follows. The interconnecting switch, e.g., SSP of a CLEC or remote LEC network, has a call that it wishes to deliver to a subscriber on a protected network served by the "true switch". Routing tables at the interconnecting switch are set up to indicate that such calls are to be sent to a specific trunk group at the Security Gatekeeper "pseudo switch". In accordance with the routing table, the interconnecting switch selects a trunk in that trunk group and forwards an IAM addressed to the Security Gatekeeper "pseudo switch". In reality, the selected trunk terminates at the "true switch". On receiving the IAM, the Security Gatekeeper "pseudo switch" decodes and validates the IAM, performing all the required mediation and other checks, and updates the call state for the trunk in question. If the message is correct, i.e., passes the appropriate mediation checks, the Security Gatekeeper "pseudo switch" generates a new IAM with the same call information, and sends it to the "true switch". The "true switch", upon receiving the LAM, checks the incoming trunk number and the dialed number to ensure that it has a valid call, and then returns an ACM to the Security Gatekeeper "pseudo switch". The Security Gatekeeper "pseudo switch" then validates the ACM, updates its call state, and generates a new ACM towards the interconnecting switch. Call setup and tear down proceeds in this way, so that even though the interconnecting switch and the "true switch" have direct trunks between them, their signaling proceeds as though it was using the Security Gatekeeper "pseudo switch" as a tandem.

There is some degree of translation work required to ensure that the Security Gatekeeper "pseudo switch" can determine the correct destination for a message based on the message originator's point code and the referenced trunk number. In general, however, this provides a means of inserting a mediation device into the ISUP call flow with minimal interference in the actual call flow. It requires no extraordinary rerouting of signaling traffic and relies on existing routing procedures in both the interconnected offices and all STPs between them.

Figure 2:
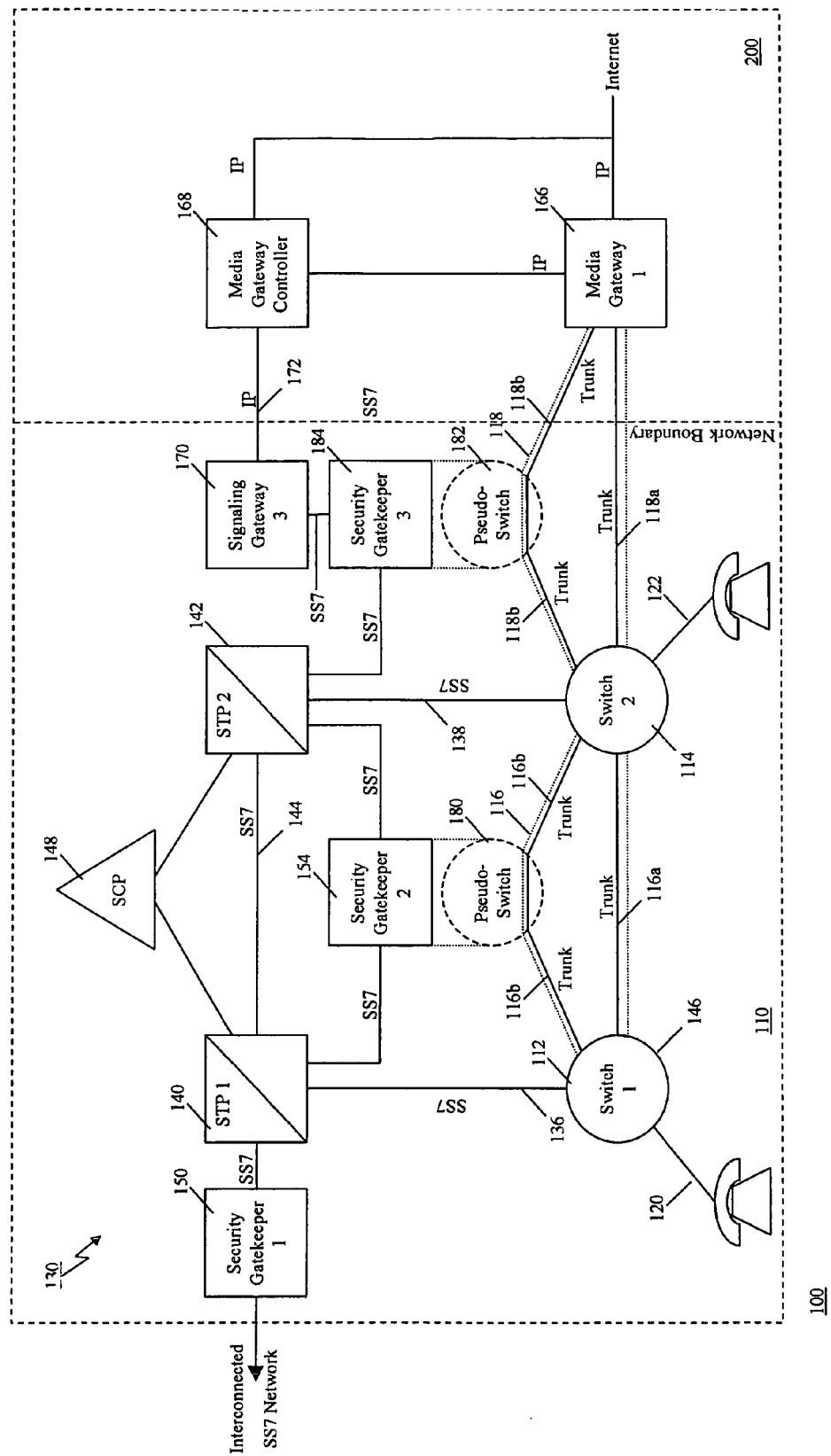
FIG. 2 is a simplified schematic block diagram of an Advanced Intelligent Network incorporating alternative arrangements of Security Gatekeepers for mediating messages within and to and from the SS7 network using "Psuedo-Switch" routing.

Examples of two "pseudo-switch" architectures are depicted in FIG. 2 of the drawings; an edge configurations as shown in connection with Security Gatekeeper 3 and an internal or central pseudo-switch configuration in connection with Security Gatekeeper 2. With reference to the latter, Security Gatekeeper 154 is viewed by the network as a tandem connecting Switches 112 and 114. Thus, voice and data traffic destined for Switch 112 and entering the network via Media Gateway 166 is logically routed to Switch 114, then to Pseudo-Switch 180, and finally to Switch 112 for termination; physical routing of voice or other bearer traffic bypasses Pseudo-Switch 180 by way of trunks directly connecting Switches 112 and 114. By logically routing calls through Pseudo-Switch 180, corresponding ISUP messaging is also provided between Switch 114 and Pseudo-Switch 180 for call routing and set-up, as well as between Switch 112 and Pseudo-Switch 180.

As part of the logical routing through Pseudo-Switch 180, Switch 114 is programmed to use an appropriate one of interconnecting trunks 116*b* logically connecting it to Pseudo-Switch 180. Thus, in negotiating a trunk to extend the call from Switch 114 to Pseudo-Switch 180, trunks 116*b*, a dedicated subset of trunks 116 connecting Switches 112 and 114, are employed. While Switch 114 and Pseudo-Switch 180 process the call and negotiate a trunk as if trunk 116*b* electrically connected the two facilities, in reality the trunk directly connects Switch 114 and Switch 112. Only after Security Gatekeeper 154 validates the IAM message, as described above, does it then perform appropriate signaling with Switch 112, including transmission of the original or a modified IAM message to Switch 112, to extend and complete the call. It should be recognized that Switch 112 processes the call just as if it had been routed to it via Pseudo-Switch 180 on trunks 116*b*, listed in its translations as connecting Switch 112 to Pseudo-Switch 180. Again, physically, Pseudo-Switch 180 is only a logical switching node controlling a dedicated subset of trunks connecting Switch 114 to Switch 112.

An important feature of the pseudo-switch for handling multiple SSPs having different point codes is a requirement that trunks of each SSP subject to security gatekeeper processing be uniquely numbered so that a common pseudo-switch can route ISUP messages based on their Originating Point Code and trunk number. That is, rather than assign the pseudo-switch multiple points codes, one for each of the target SSPs having ISUP traffic routed through the pseudo-switch, calls to be subjected to security gatekeeper processing must utilize trunks whose trunk number is unique within the originating switch's trunk group to the Security Gatekeeper. In this way, the security gatekeeper can properly route the associated ISUP traffic to the proper destination SSP.

Figure 3:
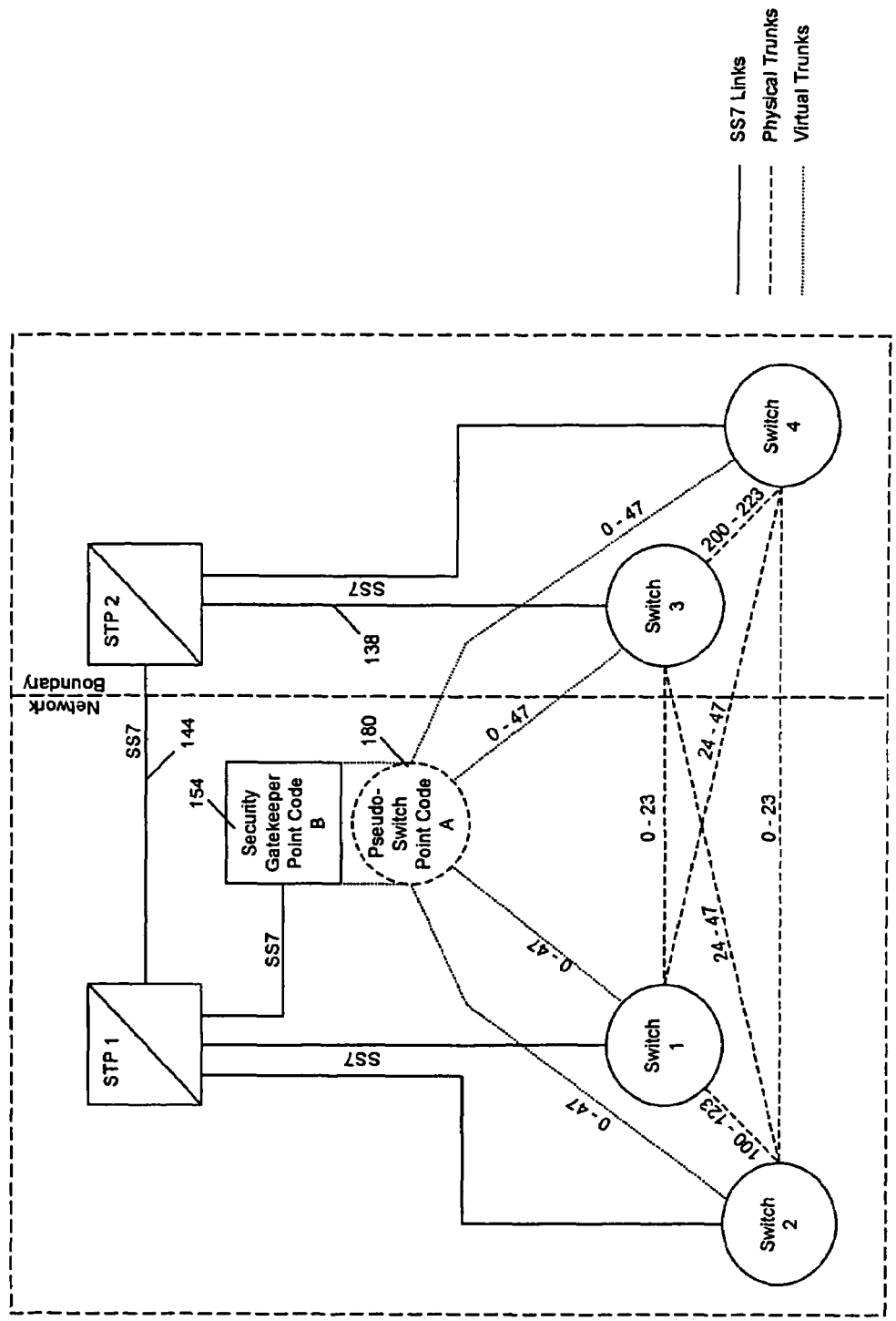
FIG. 3 is a block diagram of a Security Gatekeeper implemented as a "Pseudo-Switch" associated with uniquely identified trunks associated with multiple switches.

FIG. 3 shows an implementation of the Pseudo switch according the invention, utilized when the Security Gatekeeper is deployed in a "centralized" configuration. Switch 1 and Switch 2 are switches within the local networks that have trunks to Switches 3 and 4 in a remote network. The Pseudo Switch is deployed to mediate ISUP traffic between the local switches and the interconnected remote switches. (It could be used to mediate local traffic, as well.) Physical trunk groups of 24 trunks each connect Switch 1 to Switch 3, Switch 1 to Switch 4, Switch 2 to Switch 3 and Switch 2 to Switch 4. These trunks will carry the actual voice and/or data calls between the switches. The introduction of a Pseudo Switch enables the ISUP signaling supporting these trunks to be mediated.

In order to accomplish this, each of the switches must be translated to view the Pseudo Switch as an intermediate switch between itself and its interconnected switches, and to view each of the two physical trunk groups as a group of uniquely numbered trunks to the Pseudo Switch. The trunk numbering must be coordinated so that a reference to a specific trunk by the switch on one side of the Pseudo Switch will correspond to a reference to the same trunk on the other side. This coordination function can be performed through a priori translation (as shown in this example) or through a mapping function performed at the Pseudo Switch.

In this example, each of the four switches has been translated to "believe" that it has a group of 48 trunks between itself and the Pseudo Switch, that these trunks are numbered 0-47, and that calls that would otherwise have been routed to a switch in the other network should now be routed through the Pseudo Switch. The translations at Switch 1, for example, dictate that calls to numbers "supported" by Switch 3 should be routed to the Pseudo Switch and should be placed on a trunk numbered between 0 and 23. Calls to numbers "supported" by Switch 4, should also be routed to the Pseudo Switch, but should be placed on a trunk numbered between 24 and 47. Interconnected switches can be translated so that (for example), when Switch 1 sends a message to the Pseudo Switch concerning Trunk 15, it will refer to the same physical trunk (between Switch 1 and Switch 3) that Switch 3 references when it receives a message from the Pseudo Switch concerning Trunk 15. An advantage of this invention is that the Pseudo Switch does not need the ability to make routing decisions expected of a "normal" switch An example of call setup is as follows: Switch 3 receives a call for a subscriber which (absent the Security Gatekeeper) would normally be routed to Switch 1. Switch translations now indicate that the call should be routed to the Pseudo Switch using a trunk from among Trunks 0-23. Switch 3 then selects a trunk (15, for example) and generates an Initial Address Message (IAM). The IAM has Switch 3's Point Code in its Originating Point Code field and the Pseudo Switch Point Code in its Destination Point Code and indicates that the call is on Trunk 15. (Note that, in reality, Trunk 15 directly connects Switch 3 to Switch 1.) This IAM is then routed through the two Gateway STP pairs to the Pseudo Switch application at the Security Gatekeeper. The Pseudo Switch application performs all the verification procedures that are expected of it—Checking message syntax and parameters, parameter values, trunk state, etc. Assuming the message passes all screening criteria, the Pseudo Switch application must now send an IAM to Switch 1 so that call setup can proceed. Unfortunately, when Switch 3 sent the LAM to the Pseudo Switch, it could not include the Point Code of Switch 1 (due to message formatting rules). In fact, Switch 3 will be sending IAMs for calls that are ultimately supposed to terminate at both Switch 1 and Switch 2. Since Switch 3 has already selected a physical trunk on which it will send the call, it is essential that the Pseudo Switch determine the correct switch to which it should send the IAM, and the correct trunk number on which the call can be received by that switch. It does so by examining the Trunk number specified in the incoming IAM from Switch 3. Because the Trunk number is in the range 0-23, (rather than 24-47), the Pseudo Switch "knows" that the IAM must be sent to Switch 1 (rather than Switch 2). Further, it knows that by agreement, that when it refers to Trunk 15, Switch 1 will understand that to be the same trunk that Switch 3 referred to as Trunk 15. Thus, the Pseudo Switch generates an LAM to Switch 1, containing the call setup information it received from Switch 3, and indicating that the call will be on Trunk 15.

In response to the IAM (and assuming that the called number "lives" at Switch 1), Switch 1 will generate an Address Complete Message (ACM) to be sent back towards the call originator. Based on the received LAM, this message will be addressed to the Pseudo Switch and will refer to Trunk 15. Again, the Pseudo Switch will perform its verification tasks and, assuming the message is acceptable, seek to generate the proper ACM towards its predecessor in the call path. Again, it determines this predecessor by examining the Trunk number and the Originating Switch. Again, it determines that because the ACM came from Switch 1 and referenced a trunk in the range of 0-23, that the ACM should be sent to Switch 3. And again, it determines that, by a priori translation, the Trunk 15, referenced by Switch 1 is the same trunk that Switch 3 understands to be Trunk 15. Thus, it sends an ACM to Switch 3 indicating Trunk 15. The rest of call setup and teardown, as well as any required trunk management, proceeds in this way. In each case, the ISUP messages are routed to the Pseudo Switch application for verification, and the Pseudo Switch generates the succeeding ISUP message. It determines the Destination Point Code of the succeeding message based on 1) its knowledge of the Originating Point Code of the message and 2) the unique Trunk number referenced in the received message. It determines the Trunk number referenced in the succeeding message based either directly on the Trunk number contained in the received message, or some predefined mapping function that reflects the assignment of trunk numbers at the interconnected switches.

In this way, ISUP traffic can be diverted for review and validation using the mediation capabilities of a Security Gatekeeper without modifying the fundamental operations of the interconnected switches, or reterminating their trunks. ISUP signaling is routed through the Pseudo Switch application, while the physical trunks remain intact, directly connecting the "true" switches. The Pseudo Switch is able to manage "many-to-many" switch interconnections using a single point code because the requirement for unique trunk numbering allows it use the received Trunk number to infer the next switch on the call path. The Pseudo Switch may determine the Trunk number to be included in its outgoing messages based either on an a priori translation scheme (e.g., both switches use identical Trunk numbers, as shown above), or on an internal mapping function. It should be noted that not all ISUP traffic at a switch need be routed through a Pseudo Switch. As shown in the figure, Trunks 100-123 connect Switch 1 and Switch 2 and are not mediated. Similarly, Trunks 200-223 interconnect Switch 3 and Switch 4 and that traffic is not mediated.

Thus, according to the described preferred embodiment of the invention, the Security Gatekeeper determines the intended destination switch by a combination of the point code of the message origination and a uniquely assigned trunk number which, for that originator, identifies both the destination switch and the trunk to be used. This is in contrast to a method of enabling Security Gatekeeper 2 to know the destination switch of a particular ISUP message by assigning a set of unique point codes to Security Gatekeeper 2, one for each of the possible destination switches served by the gatekeeper. In a large network, this could result in the assignment of a large block of point codes, a requirement avoided by the trunk numbering and assignment according to the invention.

While the example presented in connection with FIG. 3 illustrates traffic from four switches, (each with trunk connections to only one other switch) being subjected to processing by Security Gatekeeper 2, any number of switches (each with trunks to multiple other switches) can be accommodated so long as no two of the trunks from any single switch "to" the pseudo-switch have the same trunk number, $2^{nd}$ that traffic is placed on a given group of trunks based on its destination. Note that, as shown in the example, different switches can reuse the same numbers for their trunks "to" the pseudo-switch. If necessary, ISUP messaging associated with trunks having trunk numbers that are not unique within the originator may be accommodated by assigning the pseudo-switch function of the Security Gatekeeper an additional point code associated with those trunks. To minimize multiple point code assignment to a Security Gatekeeper, these situations should be kept to a minimum and trunk numbering be maintained unique to the extent practical.

Referring again to FIG. 2, edge configurations are shown in connection with Security Gatekeepers 1 and 3, the latter associated with pseudo-switch 182. Although both central and edge configurations might not be required in many networks, large networks may use multiple security gatekeepers including a blend of both configurations depending on monitoring and mediation requirements. The edge model differs from a central model in that the Security Gatekeepers 1 and 3 monitor and screen traffic from directly interconnected networks rather than first routing the traffic over the existing network. The edge model provides enhanced protection to the signaling network by avoiding even the transport of messages prior to checking and thereby minimizing hazards such as Trojan horses, etc. It also allows for the checking of Network Management messages that are usually addressed directly to the interconnecting STP. Of course, the central model provides one or a limited number of Gatekeepers to support message processing for numerous interconnected networks in addition to handling messaging generated internal to the network. Security Gatekeeper 1 may include media gateway controller and Signaling Gateway functions while Security Gatekeeper 3 is connected to Signaling Gateway 1 and incorporates the a Pseudo-Switch function.

Figure 4:
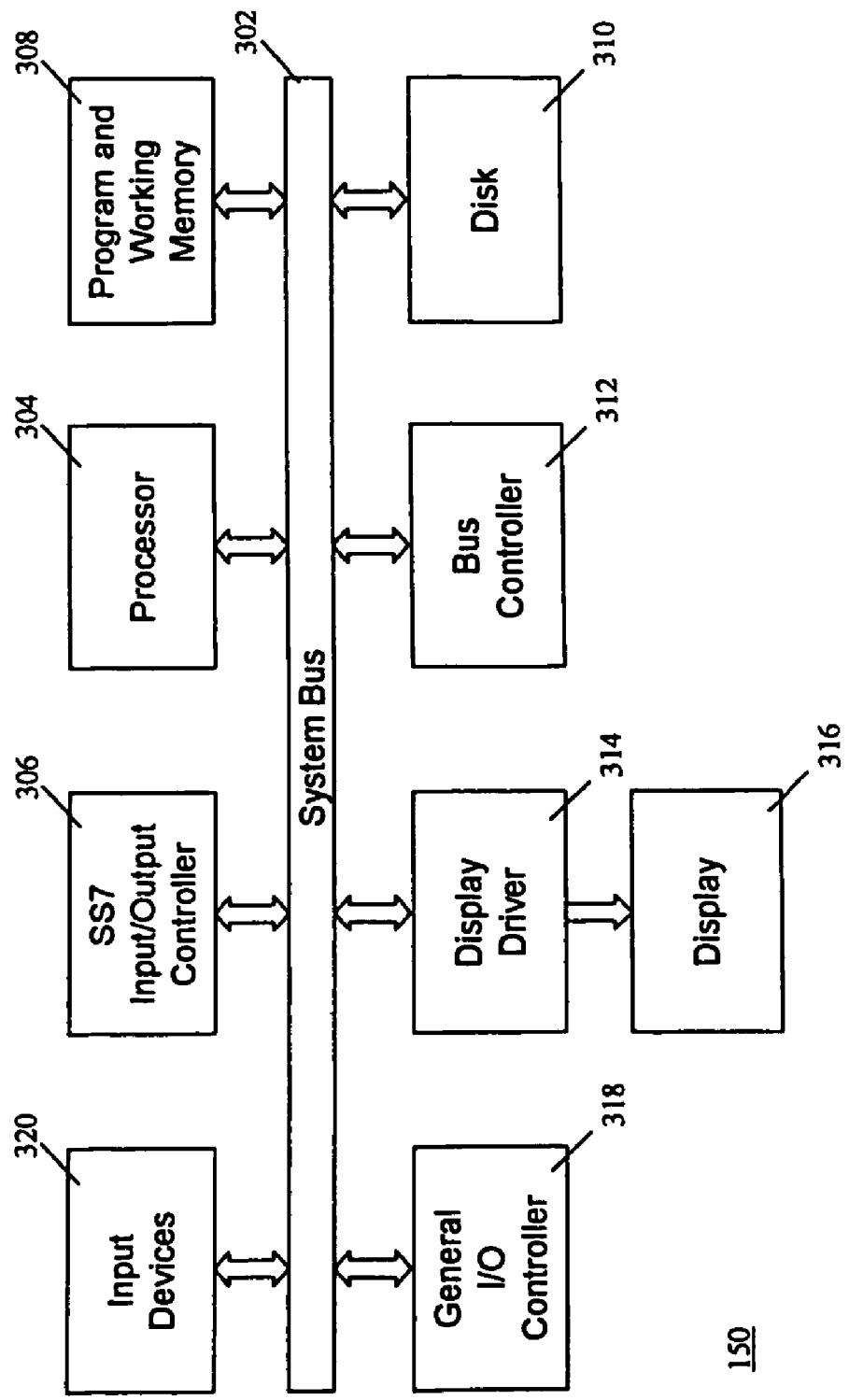
FIG. 4 is a block diagram of a computer platform configured to execute Security Gatekeeper software and perform Security Gatekeeper functions.

Referring to FIG. 4, Security Gatekeeper 150 may be implemented on a general purpose workstation or similar computer platform. According to one embodiment, Security Gatekeeper 150 includes a System Bus 402 connected to a Processor 404. Connectivity with the SS7 is provided by SS7 Input/Output Controller 406 which includes appropriate electrical and protocol interfaces for connecting to an associated SS7 "A" link. Other devices connected to System Bus 402 include Program and Working Memory 408 storing a system operating system, utilities, the Security Gatekeeper application software, and service and system status/state tables; storage in the form of Disk 410 storing, inter alia, user profiles, tables relating point codes, telephone numbers, and other data relating to defining privileges, message templates appropriate to various services, etc. Also connected to System Bus 402 are Bus Controller 412 for controlling data and addresses carried by System Bus 406, Display Driver 414 and a monitor in the form of Display 416 providing a visual indication of system status, General I/O Controller 418 supporting communications with external networks and devices, and Input Devices 420 such as keyboard, pointing device, etc.

Figure 5:
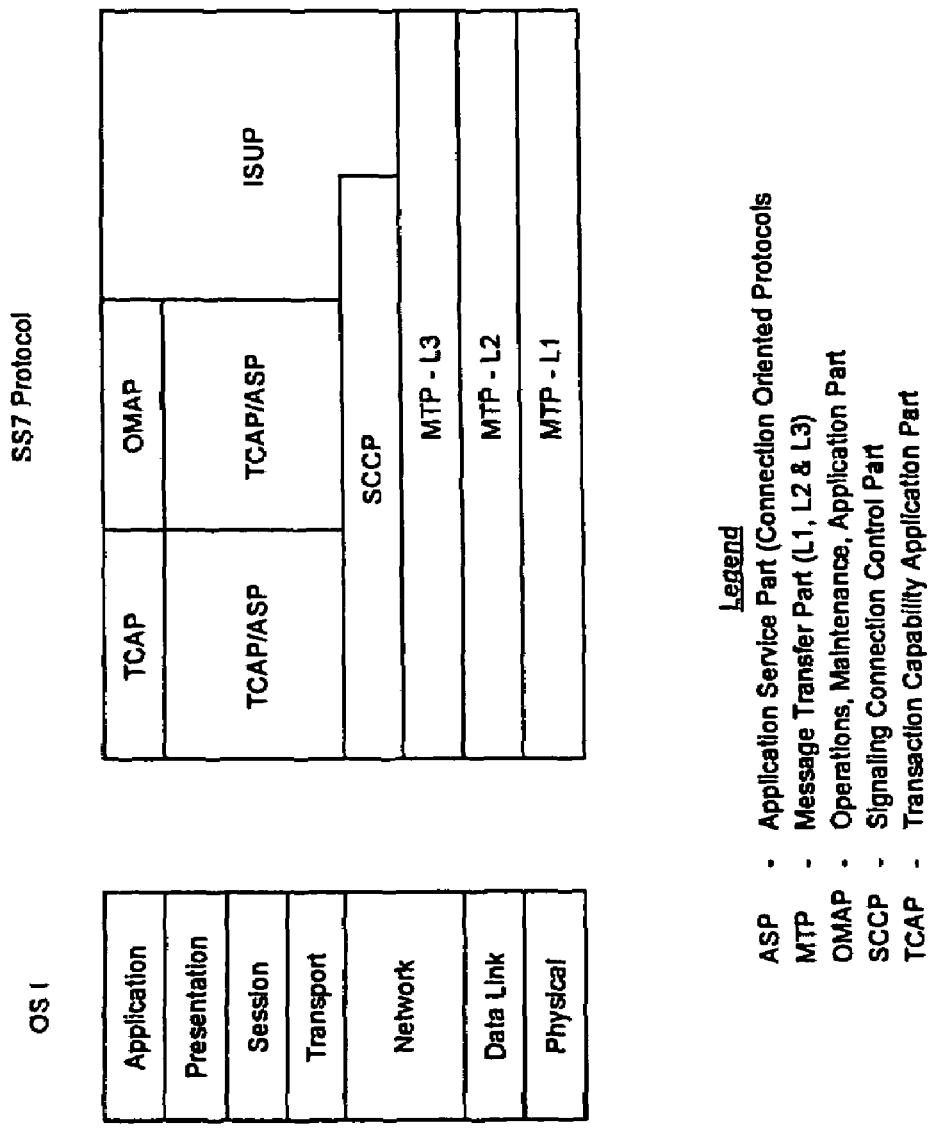
FIG. 5 is a diagram of an SS7 Protocol Stack.

The Security Gatekeeper performs a full decode of all originating and terminating SS7 messages. FIG. 5 is a diagram of the SS7 protocol stack processed by the Security Gatekeeper. Message Transfer Part (MTP) Layers 1, 2 and 3 correspond to the ISO Open System Interconnect (OSI) layers 1, 2 and 3, i.e., the Physical, Data Link and Network layers, respectively. Thus, MTP-L(ayer)1 represents the physical, electrical and functional characteristics of the digital signaling link, e.g., V.35; DS-0; DS-0A. MTP-L2 ensures accurate end-to-end transmission of message across a signaling link, supporting flow control, message sequence, validation, and error checking. MTP-L3 supports message routing between signaling points in the SS7 network.

The Signaling Connection Control Part (SCCP) corresponds to OSI Transport Layer 4, with the SS7 Transaction Capabilities Application Part (TCAP) and supported services corresponding to OSI Session Layer 5, Presentation Layer 6 and Application Layer 7 combined. Both the Telephone and ISDN User Parts (i.e., TUP and ISUP) correspond to OSI Layers 4 through 7.

The functions performed by the Security Gatekeeper at each of the SS7 levels are detailed in table 1 as follows.

| Layer | Message | Check(s) and Actions Performed |
|---|---|---|
| 1 | | Standard checking performed by hardware/software. |
| 2 | | Standard level 2 functions plus check of Link maintenance messages. |
| 3 | MTP3 | Authority - Checks Destination and Originating Point Codes and Service Indicator and determines if the point code relationship is valid for the type of service requested as defined by the service indicator. Checks MTP 2/3 syntax. Message Discrimination - Computation of rate at which messages are sent to a specific DPC and determine if rate exceeds predetermined or dynamically set threshold value indicating message rate is excessive for a particular time period. This check identifies unusually high message volume that may be indicative, e.g., of a "Denial of Service" attack in the network. |
| | SCCP | Type/Class Check - Check of all SCCP message to ensure that |

-continued

| Layer | Message | Check(s) and Actions Performed |
|---|---|---|
| | | the SCCP message type and SCCP message class are consistent with expectations. Check SCCP syntax. All SCCP messages of an unexpected message type or message class are identified and subjected to user-defined treatment.<br>Calling/Called Party Check - Calling and Called Party Address information parameters of each SCCP message are checked to ensure that the message is consistent with an authorized signaling relationship. The system provides user-defined treatment for SCCP messages for which there is not an authorized signaling relationship between the subsystems identified in the Calling and Called Party Address parameters. Check message priority against expected priority.<br>Status Report - An appropriate SCCP message is sent notifying appropriate systems in the event that a message is discarded. |
| 4-7 | ISUP | Decoding - All ISUP messages are decoded.<br>Type Check - A list of all permitted ISUP messages is maintained. ISUP messages (SI = 5) having a message type not on the list are subjected to user-defined treatment. A separate listing may be maintained for pairs of originator/destination point codes. Check message priority for specific message type.<br>Parameter Check - A list is maintained of required ISUP parameters associated with respective permitted ISUP messages. For some or all such parameters, the system provisions a default value. If a message being processed does not include one or more of the required parameters, the message is subjected to user-defined treatment unless the default values have been defined for all missing required parameters. If default parameters are defined for all missing required parameters, the message is modified to include the applicable default values for the missing parameters and the message evaluation and processing continues.<br>Permitted ISUP Parameters - A list is maintained of permitted ISUP parameters associated with each permitted ISUP message. These, along with the required parameters are the only parameters that may be passed to a destination node.<br>Prohibited Optional ISUP Parameters - A list of prohibited optional parameters is maintained for each ISUP message. These prohibited optional parameters can be removed or deleted from a message without affecting the intended impact of the message. If encountered, these parameters are removed from a message before transmission to the destination node.<br>Unrecognized ISUP Parameters - Messages containing ISUP Parameters that are not listed as permitted, optional or prohibited are subject to user-defined treatment, possibly including parameter discard as well as message discard.<br>Allowable Values - For each allowed or required ISUP parameter in each message, the system maintains a list of allowable and default values for that parameter. When a message is received, the value of each parameter is checked against the list. If the parameter value is inappropriate, then a provisionable action is taken such as dropping the message, dropping the parameter, modifying the parameter or passing the message unmodified. All recognized and authorized parameters are reviewed in this manner.<br>Trunk Status- The system maintains the status of all SS7 trunks and trunk groups between covered pairs of switched and the Circuit Identification Codes assigned to the trunks.<br>System State Representation - The system maintains an internal representation in the form, for example, of a state diagram or state table, identifying all permissible call states (nodes) and transitions (edges) between states (i.e., connecting the nodes) and the messages (inputs) associated with progressing or transitioning from one state to another.<br>Call Progress/Status - The system maintains call progress and status data based on the state diagram and provides user-defined treatment for all messages that are inconsistent with the current state of the call or permissible transitions and next states. The system further takes action to restore system stability following the discard of a message.<br>Default Messages - The system is configurable to send predefined messages in those instances that it does not pass a message unmodified. |
| | TCAP | Decoding - The system fully decodes all TCAP messages.<br>Authorization - The system determines whether the TCAP message type is authorized based on the OPC/DPC, CgPA/CdPA, Transaction ID(s) and the state of any existing transaction between the CgPA and CdPA. |

-continued

| Layer | Message | Check(s) and Actions Performed |
|---|---|---|
| | | TCAP Components - The system determines whether the TCAP components contained within a message are authorized based on the OPC/DPC, CgPA/CdPA, transaction IDs and the state of any existing transaction between the CgPA and CdPA<br>Recovery - The system includes rules including actions to be taken when inappropriate messages, components, parameters and/or parameter values are encountered. In all such cases, the system may be provisioned to either discard the message entirely, modify it (by dropping parameters or components, or modifying parameter values), or route the message (while generating a message to a maintenance log.)<br>Notification of Failed TCAP Message - The system may generate an appropriate TCAP response message in the event a message is discarded and/or modified.<br>TCAP Authority - The system may make a determination if OPC and CgPA are authorized to initiate a TCAP message to the DPC concerning a subscriber (e.g., an unauthorized request from network provider to change the state of a message waiting indicator.)<br>CdPA/CgPA Parameters Check - Based on the OPC/DPC and/or CdPA/CgPA relationship, as well as possibly subscriber number, the system may determine if the TCAP service parameters requested are authorized. |
| AIN | | Authority to Exchange AIN messages - Determine if the OPC/CgPA/calling number relationship is authorized to initiate or exchange AIN messages (e.g., unsolicited AIN messages to switch instructing it to activate/deactivate AIN services on a given line of group of lines.)<br>Service Provider ID Check - Analyzes AIN query and response and determines if the messages are authorized based on service provider service identified and its relationship to the OPC, CgPA/CdPA, and the calling/called party number (e.g., prevents a user from accessing services that they have not subscribed to.) |

Figure 6:
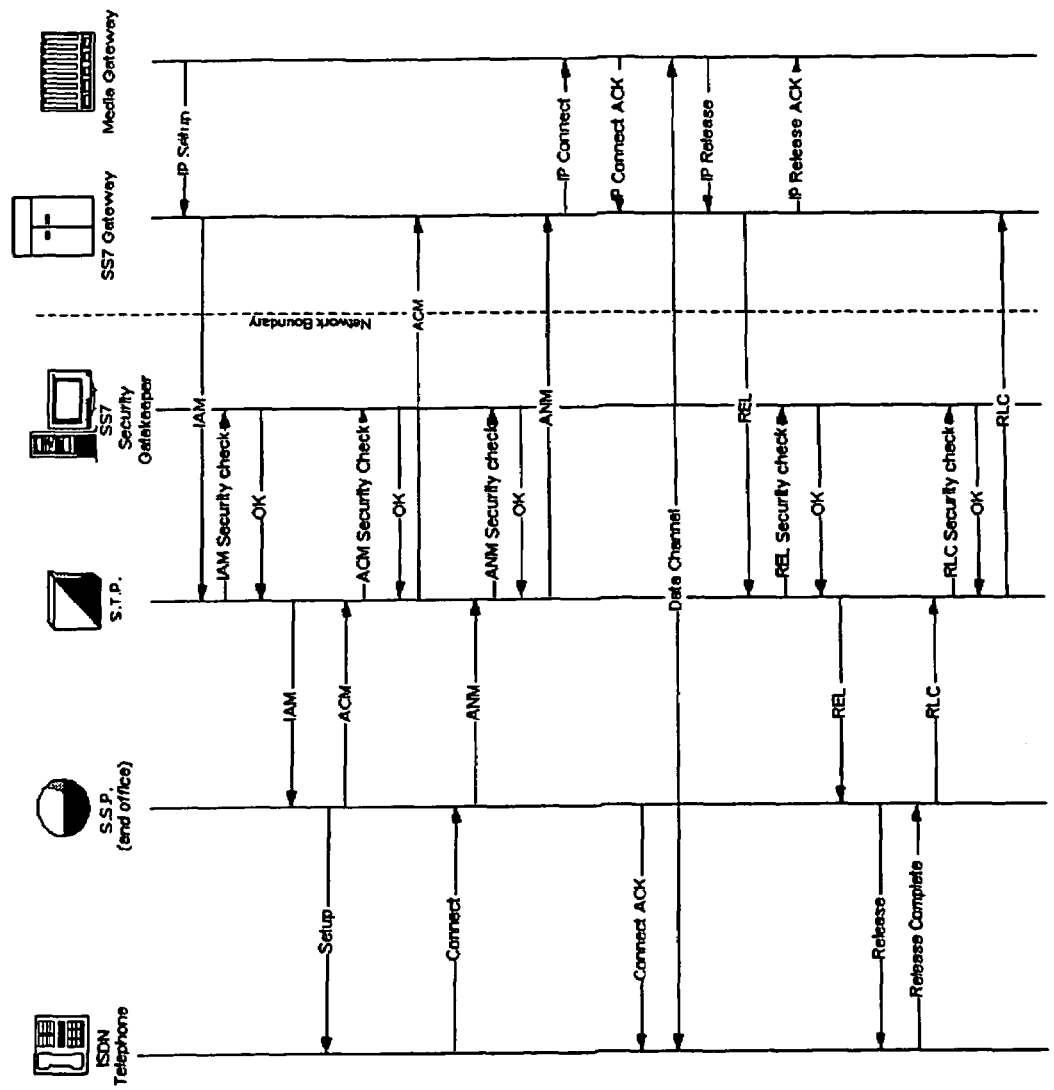
FIG. 6 is a call flow diagram depicting messaging between and among SS7 network elements for setting up a call into the local network from an external IP network with a centralized Security Gatekeeper and an external SS7 Gateway combining the functions of a Signaling Gateway and Media Gateway Controller.

FIG. 6 depicts a typical call flow for completing an incoming call from a remote VoIP network to a local telephone number using a centralized Security Gatekeeper model. Processing is initiated when an IP (Call) Setup message is forwarded by the Media Gateway to the SS7 Gateway. In response, an IAM (Initial Address Message) is sent over an SS7 "A" link to an associated STP. The STP initiates a corresponding IAM Security check request to the Security Gatekeeper. (Note that this and other "security check" messages described below in connection with FIG. 6 are not required in the edge model.) The Gatekeeper performs several levels of checks to ensure that the IAM is appropriate, including verifying that the message originator (as indicated by the originating point code) is authorized to complete a call on the network to the designated destination point code, that the message was received via a SS7 Gateway and STP appropriate to the destination point code, that the status of the call setup process is appropriate to the message, etc. The Security Gatekeeper may also check the digital certificate of the OPC device or system and the timestamp of the message to ensure that the message is authentic and timely.

Assuming that the Security Gatekeeper determines that the message is authentic, authorized and appropriate, it provides a corresponding "OK" message to the STP indicating that the IAM should be released. The STP transmits the IAM to the SSP end office which sends a call setup message to the called subscriber's equipment, in this case an ISDN terminal. The SSP then sends an Address Complete Message (ACM) to the STP for eventual transmission to the SS7 Gateway. However, the message is first routed to the Security Gatekeeper to ensure that it is correct and satisfies all required criteria prior to being transmitted to the remote network and so that the Security Gatekeeper can maintain the current state of the call. Assuming that the ACM is appropriate, the Security Gatekeeper so responds back with an OK to the STP which then forwards the ACM to the SS7 Gateway. In parallel, in response to the Setup message, the ISDN terminal alerts the subscriber. If the subscriber accepts the call, the ISDN terminal issues a Connect message back to the end office switch (i.e., the SSP) which, in turn, issues an ANswer Message (ANM) to the STP for forwarding to the call setup initiator. However, the STP first verifies with the Security Gatekeeper that the ANM is appropriate. Assuming that the message is appropriate (as in the present sequence and assuming continued authentication of messages and authority), the Security Gatekeeper issues an "OK" message back to the STP prompting it to forward the ANM to the SS7 Gateway. The SS7 Gateway translates the ANM into a corresponding IP Connect message for transmission to the remote network via the Media Gateway. The IP Connect Acknowledge (ACK) message from the remote network is then received by the SS7 Gateway. In parallel, the SSP issues an SS7 ACK to the ISDN terminal. Thereupon, a Data Channel is established over the Switched Network portion of the network to the Media Gateway and thereon to the remote network.

To end the call, the remote network issues an IP Release message to the Media Gateway which forwards the message to the SS7 Gateway. The IP message is translated into an SS7 REL message and sent to the STP. Again, prior to forwarding of the REL to the switch, the STP first requests that the Security Gatekeeper confirm that the message is authentic, complete, authorized, and appropriate by issuing a REL Security Check message to the gateway. In response to a verification that the message is proper, the Security Gatekeeper issues an "OK," prompting the STP to release the message to the SSP for processing. The SSP issues an ISDN release message to the called ISDN terminal which releases the line and responds with a Release Complete (RC) message to the SSP. The SSP generates a Release Complete (RLC) message that it forwards to the STP but, again the STP first requires that the Security Gatekeeper check the message before it is sent to the SS7 Gateway. Once the Security Gatekeeper "OKs" the message, normal release processing completes.

Figure 7:
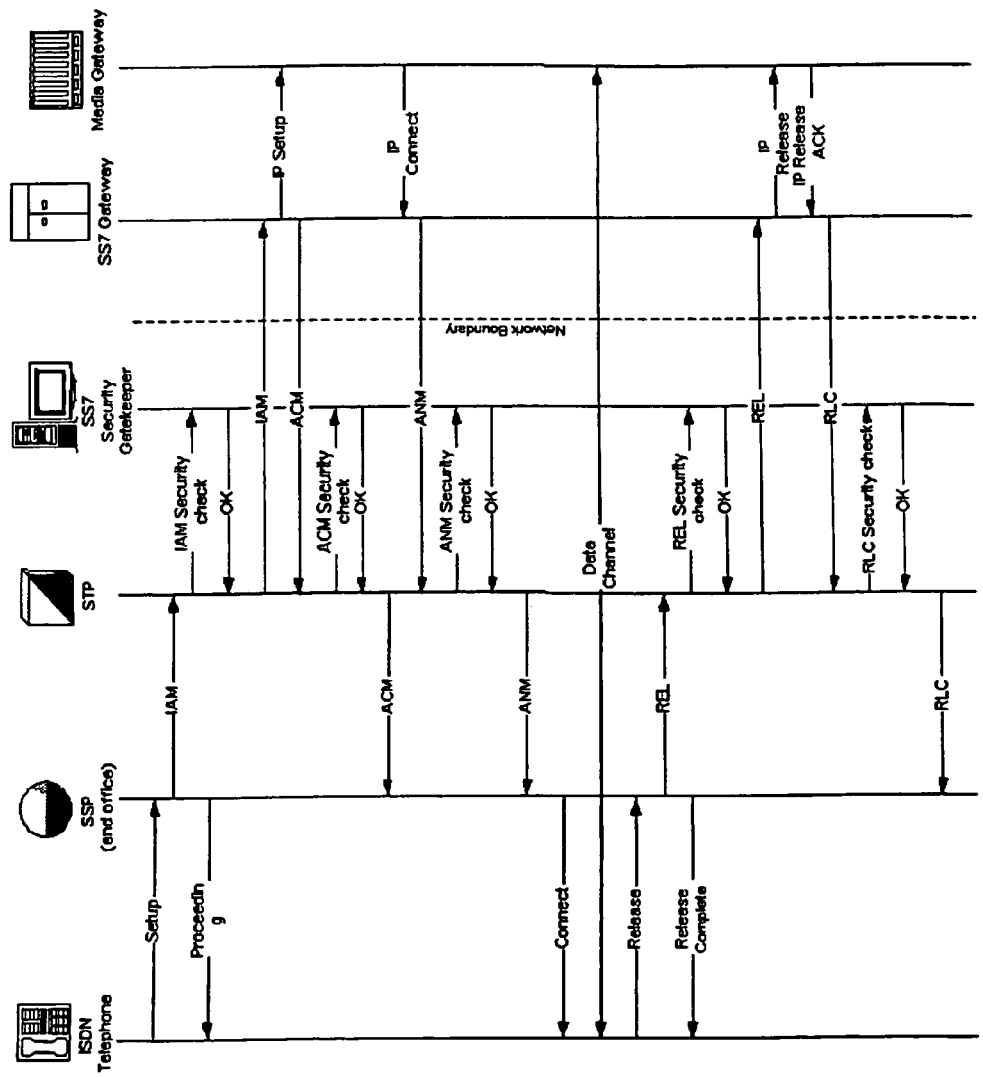
FIG. 7 is a call flow diagram depicting messaging between and among SS7 network elements for setting up a call from the local network to an external IP network using a Centralized Security Gatekeeper.

The procedure and messaging for establishing a call from a party on the local switched network to a party on the remote IP network is detailed in the call flow of FIG. 7. The call flow is similar to normal incoming call set-up and release (or tear-down) processing, shown in FIG. 6, except that the flow of messages is reversed; all control messages transiting between the two signaling networks are still checked by the Security Gatekeeper prior to transmission to the local destination SSP or to the SS7 Gateway for transmission to the remote network and upon receipt prior to being provided to the DPC device or system. As with the call flow of FIG. 6, the IAM, ACM, REL and RLC security check messages from the STP to the Security Gatekeeper implemented in the centralized Security Gatekeeper model are not required in the edge model.

The Security Gatekeeper incorporates data encryption techniques including digital signatures and time stamps to maintain system security and enhance message authentication processing. Protocols supporting IP telephony and other IP-based transport of services employ security techniques to assure the source validity of messages. One such technique employed is IP Security Protocol (IPSec). IPSec provides the ability to use encryption technology to certify the authenticity of the source through use of an unalterable, easily verifiable digital signature and time stamp. Unfortunately, no equivalent verification tool or instrument is available for basic call setup messages in the SS7 message domain. Instead, the Security Gatekeeper provides a digital signature and time stamping capabilities in the SS7 Integrated Services Digital Network User Part (ISUP) protocol messages.

The Security Gatekeeper also performs Originating Point Code digital signature processing and timestamp authentication. This processing further enhances network security since, when interconnecting the SS7 Signaling Networks to an IP-based, packet or other SS7 networks is desirable to authenticate these interconnecting networks. The Security Gatekeeper supports this authentication function by providing the ability to certify the Originating Point Code (OPC) of outgoing messages and authenticate the OPC of incoming messages with encrypted digital signatures. The digital signature is encrypted based upon Appendix F of T1.655-1996—SS7 Upper Layer Security Capabilities.

When a new network node is added to the signaling network, it is authenticated by the Security Gatekeeper. The new node and the Gatekeeper initiate a non-call associated TCAP exchange to establish the security context. This context is based on T1.655-1996. The network element and the Gatekeeper encryption keys certificates are exchanged. The Gatekeeper thereby functions as a Certifying Agent for all network nodes within its domain, certifying their point codes with an encrypted digital signature of the point code and timestamp. Digital signature and timestamping capability can be extended to any network element attaching to the SS7 network. The Security Gatekeeper can then authenticate each network element. Certificates issued by the Security Gatekeeper may be issued with limited valid periods of use, corresponding to the known authority of the recipient.

New fields are added into a new optional ISUP message defined for security context relationships. Because the field is optional, existing network elements without the authentication feature can ignore the digital signature and time stamp. For new network elements employing this capability, the information can be extracted and analyzed to ensure the originating point code is valid.

Figure 8:
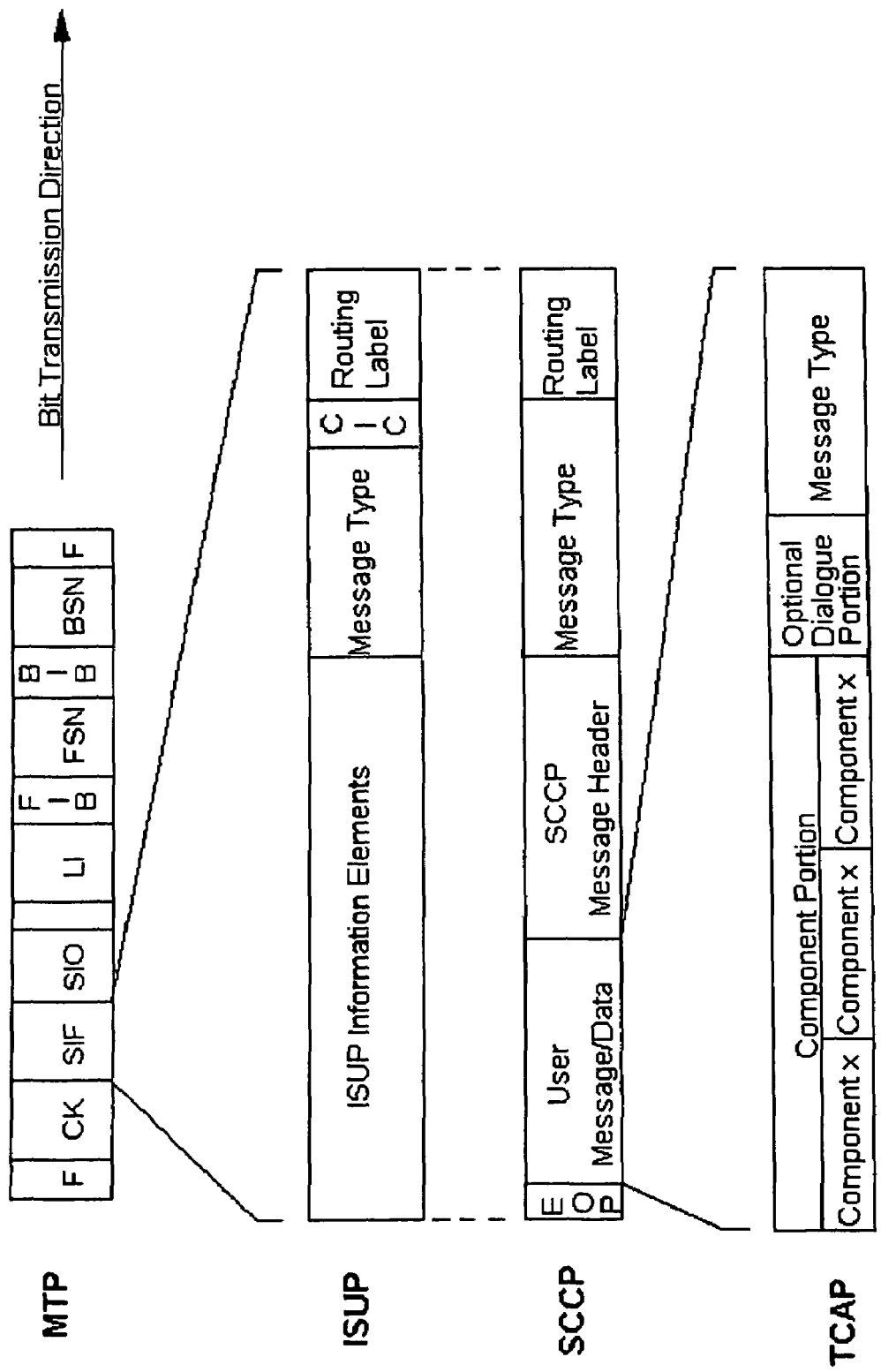
FIG. 8 is a diagram of SS7 message structure depicting the relationship between the SS7 MTP and SCCP message formats and the ISUP and TCAP user part messages.

Message formatting to provide SS7 security association activation is shown in FIGS. 8-12. Therein, FIG. 8 depicts the relationship between the SS7 MTP and SCCP message formats and the ISUP and TCAP user part messages that they are used to support. The SS7 MTP Level 2, depicted in the top of FIG. 8 ensures accurate end-to-end transmission of a message across a signaling link. Of the three types of SS7 signal units, the Message Signal Units (MSU) as depicted has eleven fields including an 8-bit Flag (F), a 7-bit Cyclic Redundancy Check (CK), an 8 n bit (n<272) Signaling Information Field (SIF), an 8-bit Service Information Octet (SIO), a 6-bit Length-Indicator (LI) with 2 spare bits, a 1-bit Forward Indicator Bit (FIB) and 7-bit Forward Sequence Number (FSN), a 1-bit Backward Indicator Bit (BIB) and a 7-bit Backward Sequence Number (BSN) and an 8-bit Flag (F).

The format of an ISUP message corresponding to the Signaling Information Field is shown under the MTP format in FIG. 8. The ISUP message includes a Service Information Octet and Routing Label, a Circuit Identification Code, a Message Type octet, and ISUP Information Elements dependent upon the type of ISUP message. Alternatively, a Signaling Connection Control Part (SCCP) message may be incorporated within the SIF. An SCCP message includes a Service Information Octet and Routing Label and a Message/Type octet. The SCCP Message Header and User Message/Data fields vary according to the message type. Finally, the message concludes with an End of Packet (EOP.)

TCAP information is contained in the User Message/Data field of the SCCP Unitdata message. The TCAP message includes a Transaction portion including a Message Type field followed by an Optional Dialogue Portion. The Transaction portion contains the package type identifier. There are seven package types: Unidirectional, Query with Permission, Query without Permission, Response, Conversation with Permission, Conversation without Permission, and Abort. The transaction portion also contains the Originating Transaction ID and Responding Transaction ID fields linking the TCAP transaction with an invocation of a specified application at the originating and destination signaling points. A component portion of the TCAP includes multiple components. The six types of components available include Invoke (Last), Invoke (Not Last), Return Result (Last), Return Result (Not Last), Return Error, and Reject. Components include parameters representing data specific to an application that utilizes the services of TCAP. They are not examined by TCAP.

FIG. 9 shows the structure of an ISDN User Part message (including its MTP header and trailer) based upon ANSI T1.113. FIG. 10 further expands the ISUP message coding to show how parameters are incorporated into an ISUP message. FIG. 11 builds upon the TCAP message Security Context format, specified in ANSI T1.655, to show how the Security Context can be incorporated into ISUP messages using a new ISUP message Security Context parameter. FIG. 12 includes a proposed table of Security Context values of the ISUP Messages included within the security context parameter. Depending on the value of the Security Context Value, subsequent information provided in the parameter would provide the information necessary to authenticate the message.

Figure 13:
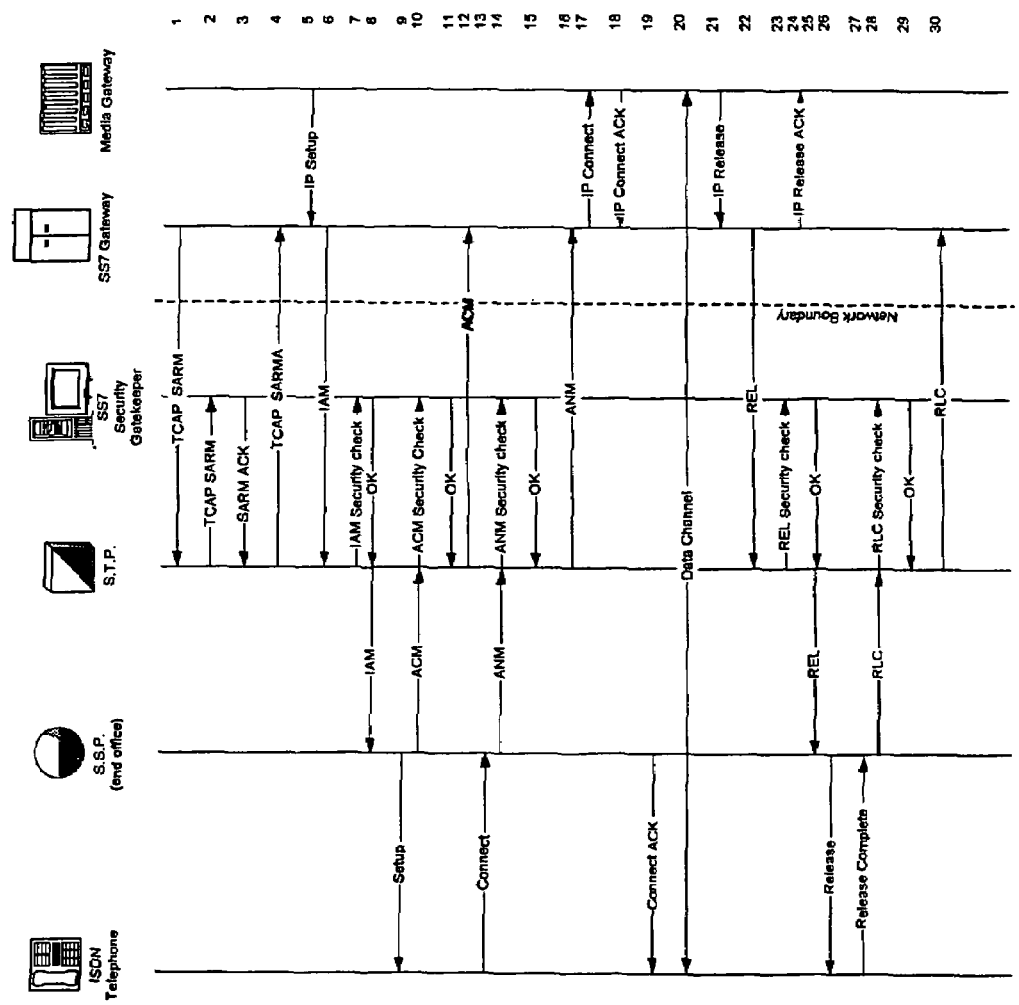
FIG. 13 is a call flow diagram depicting SS7 security association activation between an SS7 Gateway and a Security Gatekeeper deployed in a Centralized configuration.

FIG. 13 represents the SS7 security association activation between the SS7 Gateway and the Security Gatekeeper. Referring to FIG. 13, the security exchange signaling flow begins with receipt of a TCAP SARM (Security Activation Request Message). The security negotiation is exchanged between the Signaling Gateway and the Security Gatekeeper to activate the security relationship. The SARM is initiated by the Signaling Gateway specifying the requested security context for the encryption key exchange, digital signature and time stamp. The Security Gatekeeper accepts the Security Association Request, activates the security context relationship and returns a Security Association Request Message Acknowledgment (SARM Ack). The security association is thereby established between the Signaling Gateway and the Security Gatekeeper. Signaling Gateway and the Security Gatekeeper then use digital signature and timestamping to sign the originating point code and time stamp the SS7 ISUP messages for authentication. The security association method is summarized as follows:

| Step | Action |
|---|---|
| 1. | The SS7 Gateway sends a TCAP Security Association Request Message to the STP. |
| 2. | The STP forwards the TCAP Security Association Request Message to the Security Gatekeeper for security association activation. |
| 3. | The Security Gatekeeper sends the TCAP Security Association Request Message Acknowledge back to the STP. The security association has now been established and digital signature and time stamping capabilities are now available for use. |
| 4. | The STP then forwards the TCAP Security Association Request Message Acknowledge to the SS7 Gateway. |
| 5. | The Media Gateway sends an IP Setup message to the SS7 Gateway. |
| 6. | The SS7 Gateway sends an SS7 IAM message to the STP. |
| 7. | The STP routes the IAM message to the Security Gatekeeper for analysis. |
| 8. | The Security Gatekeeper analyzes the message, ensuring that the format and content are appropriate. The Security Gatekeeper then sends the "authenticated" IAM message back to the STP, which forwards the message to the correct end-office. |
| 9. | The end-office sends a SETUP message to the end station. |
| 10. | The end-office generates an Address Complete Message (ACM) to the STP with the SS7 Gateway's DPC. The STP interprets the SS7 Gateway's DPC and forwards the ACM message to the Security Gatekeeper for analysis and validation. |
| 11. | The Security Gatekeeper validates the message and sends it back to the STP with the SS7 Gateway's DPC. |
| 12. | The STP sends the ACM message to the SS7 Gateway |
| 13. | The end station sends a Connect message to the end-office. |
| 14. | The end-office generates an ANM destined for the SS7 Gateway to the STP. The STP interprets the SS7 Gateway's DPC and forwards the ANM message to the Security Gatekeeper for analysis and validation. |
| 15. | The Security Gatekeeper validates the message and sends it back to the STP with the SS7 Gateway's DPC. |
| 16. | The STP sends the ANM message to the SS7 Gateway. |
| 17. | The SS7 Gateway sends an IP Connect message to the Media Gateway. |
| 18. | The Media Gateway responds with an IP Connect ACK message. |
| 19. | The end-office sends a Connect ACK message to the end station. |
| 20. | The switches connect the trunks from the networks to the subscriber's line for two-way communications. |
| 21. | When the transaction has been completed, the Media Gateway generates an IP Release message to the SS7 Gateway. |
| 22. | The SS7 Gateway sends a Release (REL) Message to the STP. |
| 23. | The STP forwards the REL message to the Security Gatekeeper. |
| 24. | The Gateway sends an IP Release ACK to the Media Gateway. |

-continued

| Step | Action |
|---|---|
| 25. | The Security Gatekeeper validates the REL message and returns an "OK" to the STP, which forwards the REL message to the end-office switch. |
| 26. | The end-office sends a Release Complete message to the end station. |
| 27. | The end station sends a Release Complete message to the end-office switch. |
| 28. | The end-office switch sends the RLC to the STP, which forwards the RLC message to the Security Gatekeeper, where the message is validated. |
| 29. | The Security Gatekeeper sends an OK on the RLC message to the STP. |
| 30. | The STP then sends the RLC message to the SS7 Gateway. |

Figure 14:
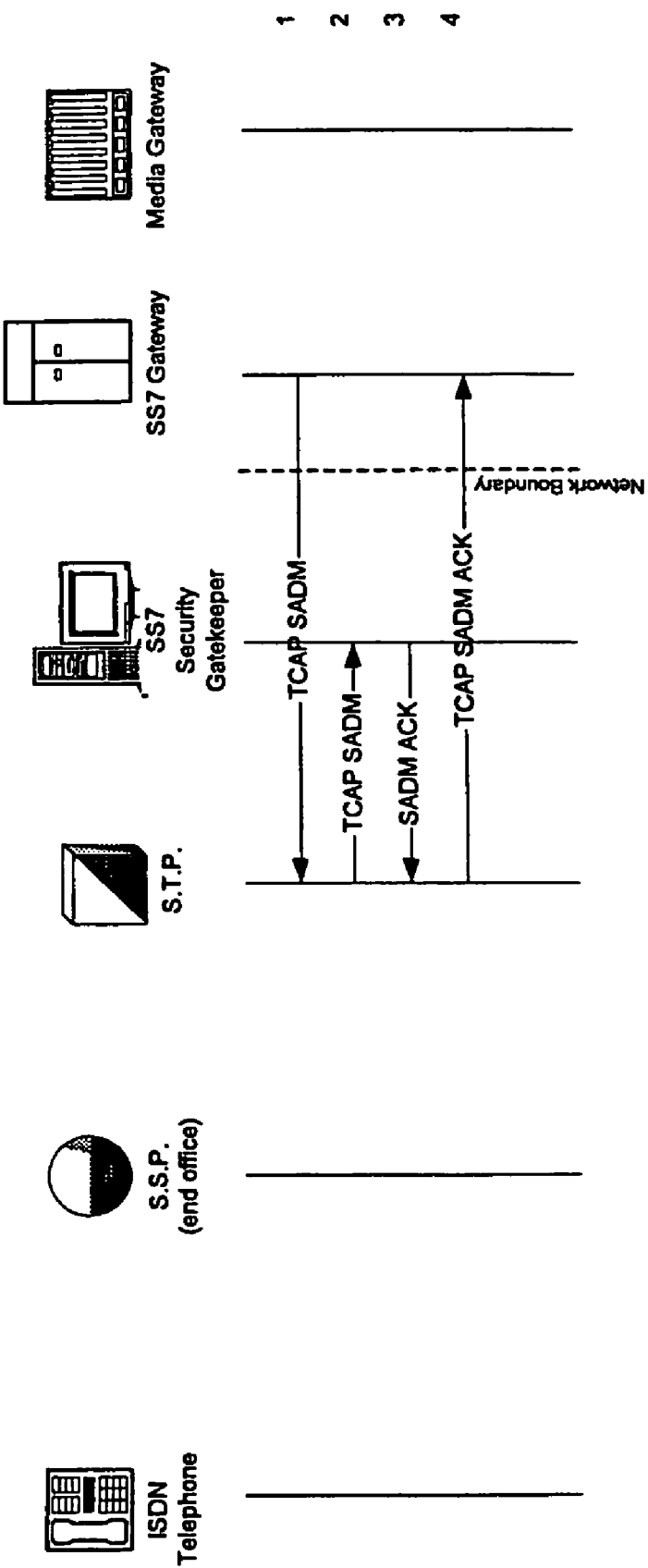
FIG. 14 is a call flow diagram depicting SS7 security association deactivation between an SS7 Gateway and a Security Gatekeeper deployed in a Centralized configuration.

FIG. 14 represents the deactivation of the security association. A Security Association Deactivation Message is sent from the Signaling Gateway to the Security Gatekeeper. The Security Gatekeeper deactivates the security relation and returns a Security Association Deactivation Message Acknowledgment message.

Referring to FIG. 14 depicting Security Gatekeeper Security association deactivation signaling flow, i.e., an SS7 Gateway Initiated TCAP Request, proceeds as follows.

| Step | Action |
|---|---|
| 1. | The SS7 Gateway sends a TCAP Security Association Deactivation Message to the STP. |
| 2. | The STP forwards the TCAP Security Association Deactivation Message to the Security Gatekeeper for security association deactivation. |
| 3. | The Security Gatekeeper sends the TCAP Security Association Deactivation Message Acknowledge back to the STP. |
| 4. | The STP then forwards the TCAP Security Association Deactivation Message Acknowledge to the SS7 Gateway. The security association is thereby terminated and digital signature and time stamping capabilities are no longer available for use. |

FIGS. 13 and 14 depict one scenario of a security association and subsequent deactivation. Other scenarios are possible; for example, the Signaling Gateway may request an unsupported encryption scheme at the Security Gatekeeper. The Security Gatekeeper would return a response message or propose an alternate scheme. Such negotiations could continue until all alternatives on either network element are exhausted, at which point an error message would be generated canceling the Security Association request. In some embodiments, failure to establish a Security Association will be logged and/or alarmed.

Although the examples describe the initiation of the security association by the Signaling Gateway, either network element of a signaling relationship can initiate the security association request. Security associations are not limited to Signaling Gateways and Security Gatekeepers; associations can be established between other network elements and networks, such as STPs, SCPs and SSPs or other interconnection element relationships of the SS7.

Various ISUP message formats are shown in FIGS. 15-19, including an IAM (FIG. 15), ACM (FIG. 16), ANM (FIG. 17), REL (FIG. 18) and RLC (FIG. 19). The Security Gatekeeper maintains templates corresponding to these and other permissible SS7 messages against which incoming and outgoing SS7 messages are compared. Thus, required parameters and values are stored and correlated to specific origination and destination point codes in calling telephone numbers. These templates may also be associated with various system states and users.

Figure 20:
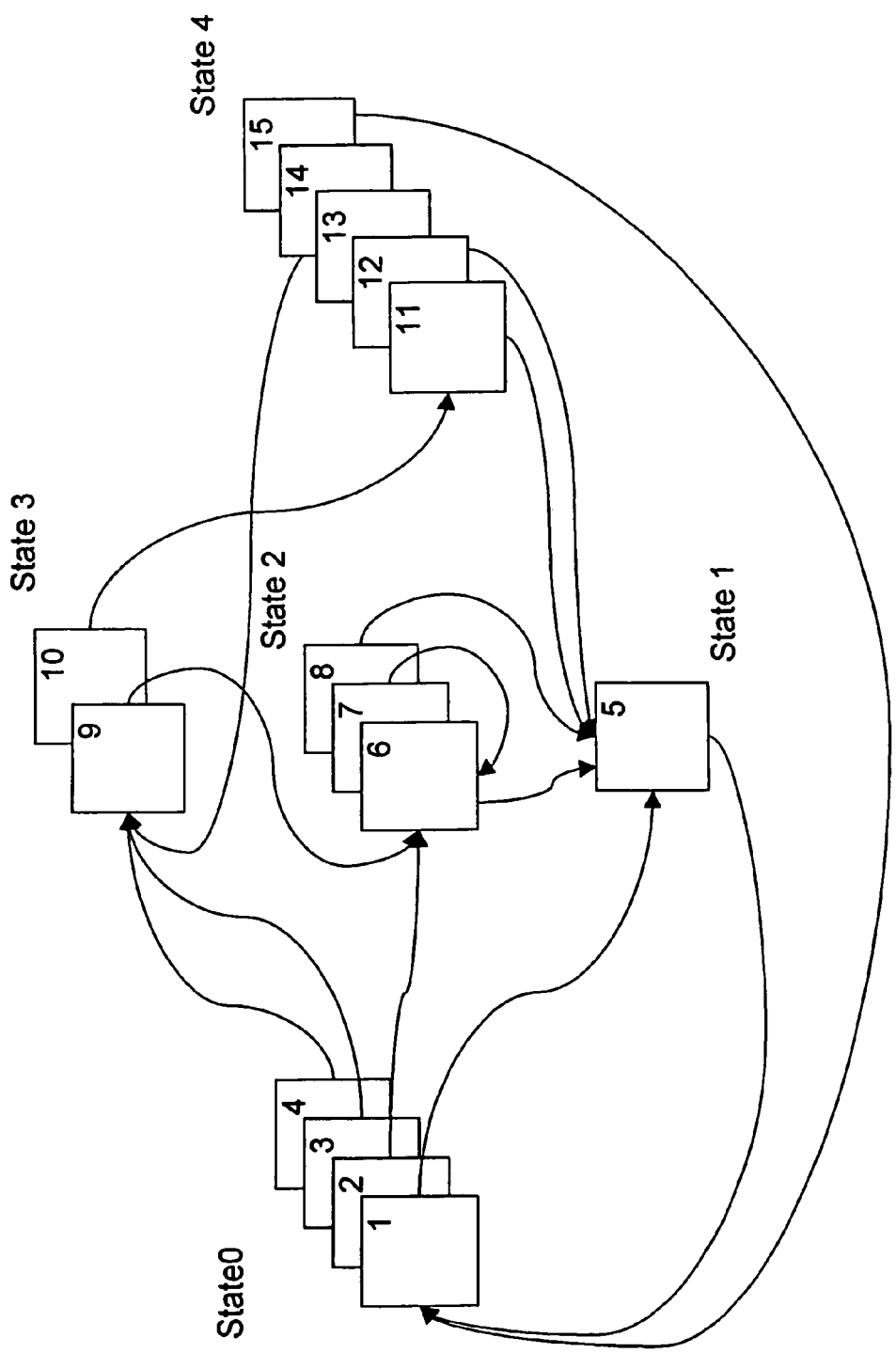
FIG. 20 is an example of a state diagram with associated message templates.

Referring to FIG. 20, the Security Gatekeeper maintains the status of the network as the set of states associated with individual calls and transactions. As shown in the example of FIG. 20, a call processing or other service includes states 0-4. Each of these states includes one or more templates defining acceptable messages that may be received or sent while the call or transaction processing is in a particular state. For example, in an initial state 0, a message type 1, 2, 3, or 4 may be received and checked by the corresponding templates. After authentication of the message and check to ensure its validity using the associated template, the state of the call or transaction progresses in response to the message. Thus, for example, from state 0, receipt of a message type 1 causes a transition to a state 1, receipt of message type 2 causes a transition to state 2, while receipt of a message type 3 or 4 transitions the call or transaction to state 3. While in state 1, receipt of a message type 5 would cause a transition back to the initial state 0. While in state 1, message type 5 is the only acceptable message, all others being rejected. Likewise, valid messages received while in state 2 include message types 6, 7 and 8. Receipt of a message type 6 causes a transition to state 1, receipt of a message type 7 maintains the call in state 2. Receipt of a message type 8 while in state 2 causes a transition to state 1. Similarly, receipt of a message type 9 while in state 3 transitions the system to state 2, while a message type 10 transitions the system to state 4. Thus, the Security Gatekeeper may associate different templates with particular call or transaction progress states to verify that a particular message is appropriate in view of the call or transaction progress. Further, each of the states may further be dictated by call independent factors, such as other system conditions and states. For example, particular messages may be processed depending on system failure and overload conditions, number of messages to and/or from particular point codes, and/or addresses, or other states of the network independent of signaling associated with a particular call or transaction.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

It should further be noted and understood that all publications, patents and patent applications mentioned in this specification are indicative of the level of skill of those skilled in the art to which the invention pertains. All publications, patents and patent applications are herein incorporated by reference to the same extent as if each individual publication patent or patent application was specifically and individually indicated to be incorporated by reference in its entirety.

What is claimed is:

1. A communication network, comprising:
   (A) local communication links,
   (B) a plurality of separately located central office switching systems interconnected via trunk circuits for selectively providing switched call connections between at least two of the local communication links in response to predetermined control data messages,
   (C) a signaling communication system for two-way communications of said control data messages between said central office switching systems, said signaling communication system interconnecting the central office switching systems;
   (D) a signaling gateway, separate from the central office switching systems and connected to said signaling communications system, said signaling gateway including an interface connected to a remote communications network and configured to exchange said control data messages between said remote communication network and said central office switching systems by way of said signaling communication system, and
   (E) a signaling system security monitor, separate from the central office switching systems, said signaling system security monitor configured to evaluate an encrypted portion of said control data messages including digital time stamps so as to authenticate corresponding ones of said control messages and, in response, determine if said control data messages are chronologically sequenced.

2. The communications network according to claim 1 wherein said signaling system security monitor comprises a certification agent configured to exchange and maintain encryption key certificates.

3. The communications network according to claim 1 wherein said signaling system security monitor is configured to issue and decrypt said digital time stamps.

4. The communications network according to claim 1 wherein said signaling system security monitor comprises a digital certificate issuing authority.

5. The communications network according to claim 1 wherein said signaling system security monitor is configured to selectively communicate said control data messages between said signaling gateway and said signaling communication system in response to said encrypted portions of said control data messages.

6. The communications network according to claim 1 wherein said signaling system security monitor is configured to selectively enable and inhibit said signaling gateway from exchanging said control data messages between said remote communication network and said signaling communication system in response to said encrypted portions of said control data messages.

7. The communications network according to claim 1 wherein said signaling system security monitor includes a memory storing states of respective ones of said central office switching systems, said processor additionally responsive to said states for determining if said control messages are proper.

8. The communications network according to claim 1 wherein said signaling gateway is configured to convert SS7 type messages to another packet data format.

9. The communications network according to claim 8 wherein the other packet data format is an Internet Protocol (IP) format.

10. The communications network according to claim 1 wherein said signaling system security monitor is configured to monitor a destination point code.

11. The communications network according to claim 1 wherein said signaling system security monitor is configured to monitor at least one of SCCP, ISUP, TCAP, and AIN messages.

12. The communications network according to claim 1 wherein said signaling system security monitor is configured to monitor calling and called party address parameters contained in SCCP message portions of said control data messages and determine if said monitor calling and called party address parameters are consistent with an authorized signaling relationship.

13. The communications network according to claim 1 wherein said signaling system security monitor is configured to monitor calling and called party address parameters contained in an SCCP message portion of said control data messages.

14. The communications network according to claim 1 wherein said signaling system security monitor is configured to monitor origination and designation point codes and calling and called party address parameters contained in a TCAP message portion of said control data messages.

15. The communications network according to claim 1 wherein said signaling system security monitor is configured to monitor origination and destination point codes parameters contained in a TCAP message portion of said control data messages and determine if a particular destination point code is authorized to send a particular TCAP message to a particular destination point code.

16. The communications network according to claim 1 wherein said signaling system security monitor includes a memory storing a state of said communications network.

17. The communications network according to claim 1 wherein said signaling system security monitor includes a memory storing permissible states of said communications network and rules for transitioning from each of said permissible states to others of said permissible states.

18. The communications network according to claim 1 wherein said signaling system security monitor includes a memory storing data relating call progress status with respective sets of control messages appropriate to initiate a next action consistent with a particular service.

19. The communications network according to claim 1 wherein said signaling system security monitor includes a memory storing a plurality of message templates corresponding to approved ones of said control data messages.

20. The communications network according to claim 19 wherein said plurality of message templates are associated with a plurality of service providers.

21. The communications network according to claim 20 wherein said signaling system security monitor associates each of said control data messages with a corresponding one of said service providers and selects one of said message templates in response to the corresponding one of said service providers.

22. The communications network according to claim 19 wherein said signaling system security monitor includes a memory storing sets of templates, each of said sets corresponding to control messages appropriate to particular call progress flow.

23. The communications network according to claim 22 wherein said templates define message formats, parameters and values associated with control message types selected from SCCP, ISUP, TCAP and AIN type messages.

24. The communications network according to claim 22 wherein said signaling system security monitor is configured to select said sets of templates in response to service provider authorization data associated with respective ones of said control data messages.

25. The communications network according to claim 1 wherein said signaling system security monitor is configured to monitor an originating point code.

26. The communications network according to claim 1 wherein said signaling system security monitor is configured to monitor a service indicator.

27. A method of securely interfacing control links of respective communication networks, comprising the steps of:

exchanging control data messages between a remote communication network and a local signaling communication system;

decrypting a certificate portion of said control data messages including a time stamp so as to authenticate originating point code information corresponding to said control data messages and, in response to said time stamp, determine if said control data messages are chronologically sequenced based on said time stamp so as to determine control message chronological sequencing;

selectively communicating, in response to said decrypting step, control data messages between central office switching systems; and selectively providing switched call connections between at least two of the local communication links in response to predetermined control data messages.

28. The method according to claim 27 further comprising a step of converting a protocol of said control data messages between a protocol of said remote communication network and a protocol of said local signaling communication system.

29. The method according to claim 28 wherein one of said protocols is an SS7 compliant message protocol.

30. The method according to claim 29 wherein one of said protocols is an Internet Protocol (IP) format.

31. The method according to claim 27 further comprising a step of monitoring of calling and called party address parameters contained in SCCP message portions of said control data messages.

32. The method according to claim 31 wherein said monitoring step includes determining if said calling and called party address parameters are consistent with an authorized signaling relationship.

33. The method according to claim 27 further comprising a step of monitoring origination and designation point codes and calling and called party address parameters contained in a TCAP message portion of said control data messages.

34. The method according to claim 33 wherein said monitoring step includes monitoring origination and destination point codes parameters contained in a TCAP message portion of said control data messages and determining if a particular destination point code is authorized to send a particular TCAP message to a particular destination point code.

35. The method according to claim 27 further comprising a step of storing a state of said communications network.

36. The method according to claim 27 further comprising a step of storing (i) permissible states of said communications network and (ii) rules for transitioning from each of said permissible states to others of said permissible states.

37. The method according to claim 27 further comprising a step of storing data relating call progress status with respective sets of control messages appropriate to initiate a next action consistent with a particular service.

38. The method according to claim 27 further comprising a step of storing a plurality of message templates.

39. The method according to claim 38 wherein said plurality of message templates are associated with a plurality of service providers.

40. The method according to claim 39 further comprising steps of:

associating each of said control data messages with a corresponding one of said service providers; and selecting one of said message templates in response to the corresponding one of said service providers.

* * * * *